United States Patent
Ise et al.

(10) Patent No.: US 10,056,615 B2
(45) Date of Patent: Aug. 21, 2018

(54) ACTIVE SUBSTANCE, NONAQUEOUS ELECTROLYTE BATTERY, AND BATTERY PACK

(71) Applicant: Kabushiki Kaisha Toshiba, Minato-ku (JP)

(72) Inventors: Kazuki Ise, Fuchu (JP); Yorikazu Yoshida, Yokohama (JP); Yasuhiro Harada, Isehara (JP); Hiroki Inagaki, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 738 days.

(21) Appl. No.: 14/489,716

(22) Filed: Sep. 18, 2014

(65) Prior Publication Data
US 2015/0086872 A1    Mar. 26, 2015

(30) Foreign Application Priority Data

Sep. 20, 2013 (JP) .................................. 2013-196142
Sep. 1, 2014 (JP) .................................. 2014-177123

(51) Int. Cl.
*H01M 4/48* (2010.01)
*H01M 4/62* (2006.01)
(Continued)

(52) U.S. Cl.
CPC ............ *H01M 4/625* (2013.01); *C01G 33/00* (2013.01); *C01G 35/006* (2013.01);
(Continued)

(58) Field of Classification Search
CPC .... H01M 4/483; H01M 4/0471; H01M 4/366; H01M 4/583; H01M 10/0525;
(Continued)

(56) References Cited

U.S. PATENT DOCUMENTS

| 6,087,044 A | 7/2000 | Iwase et al. |
| 2004/0224230 A1 | 11/2004 | Yanagida et al. |

(Continued)

FOREIGN PATENT DOCUMENTS

| CN | 102237509 A | 11/2011 |
| CN | 102694160 A | 9/2012 |

(Continued)

OTHER PUBLICATIONS

Combined Office Action and Search Report dated Apr. 5, 2016 in Chinese Patent Application No. 201410465316.8 with English translation.

(Continued)

*Primary Examiner* — Stewart A Fraser
(74) *Attorney, Agent, or Firm* — Oblon, McClelland, Maier & Neustadt, L.L.P.

(57) ABSTRACT

According to one embodiment, there is provided an active substance. The active substance includes particles of niobium titanium composite oxide and a phase including a carbon material. The niobium titanium composite oxide is represented by $Ti_{1-x}M1_xNb_{2-y}M2_yO_7$. The phase is formed on at least a part of the surface of the particles. The carbon material shows, in a Raman chart obtained by Raman spectrometry, a G band observed at from 1530 to 1630 $cm^{-1}$ and a D band observed at from 1280 to 1380 $cm^{-1}$. A ratio $I_G/I_D$ between a peak intensity $I_G$ of the G band and a peak intensity $I_D$ of the D band is from 0.8 to 1.2.

12 Claims, 8 Drawing Sheets

(51) Int. Cl.
  *H01M 4/485* (2010.01)
  *C01G 33/00* (2006.01)
  *C01G 35/00* (2006.01)
  *C01G 39/00* (2006.01)
  *C01G 49/00* (2006.01)
  *H01M 4/36* (2006.01)
  *H01M 10/0525* (2010.01)
  *H01M 4/02* (2006.01)

(52) U.S. Cl.
  CPC ....... *C01G 39/006* (2013.01); *C01G 49/0018* (2013.01); *H01M 4/485* (2013.01); *C01P 2002/72* (2013.01); *C01P 2002/74* (2013.01); *C01P 2002/76* (2013.01); *C01P 2002/82* (2013.01); *C01P 2006/40* (2013.01); *H01M 4/366* (2013.01); *H01M 10/0525* (2013.01); *H01M 2004/027* (2013.01)

(58) Field of Classification Search
  CPC ........... H01M 2004/027; H01M 4/625; H01M 4/485; C01G 39/006; C01G 33/00; C01G 35/006; C01G 49/0018
  See application file for complete search history.

(56) References Cited

U.S. PATENT DOCUMENTS

2011/0274978 A1  11/2011  Sheem et al.
2012/0052401 A1  3/2012  Goodenough et al.
2015/0364758 A1  12/2015  Harada et al.

FOREIGN PATENT DOCUMENTS

| | | |
|---|---|---|
| CN | 103081187 A | 5/2013 |
| EP | 2 385 573 A2 | 11/2011 |
| EP | 2 503 625 A2 | 9/2012 |
| JP | 6-279112 A | 10/1994 |
| JP | 10-172566 A | 6/1998 |
| JP | 2001-6682 A | 1/2001 |
| JP | 2005-525990 A | 9/2005 |
| JP | 2012-99287 A | 5/2012 |
| JP | 2012-190929 A | 10/2012 |
| JP | 2012-199146 A | 10/2012 |
| JP | 2013-69566 A | 4/2013 |
| KR | 10-2004-0081043 A | 9/2004 |
| KR | 10-2013-0096258 A | 8/2013 |
| WO | WO 03/099715 A1 | 12/2003 |
| WO | WO 2012/016185 A2 | 2/2012 |
| WO | WO 2013/035831 A1 | 3/2013 |

OTHER PUBLICATIONS

Korean Office Action dated Feb. 22, 2016 in Patent Application No. 10-2014-0121217 (with English translation).
Office Action dated Feb. 7, 2017 in Japanese Patent Application No. 2014-177123.
Jian-Tao Han, et al., "3-V Full Cell Performance of Anode Framework TiNb$_2$O$_7$/Spinel LiNi$_{0.5}$Mn$_{1.5}$O$_4$" Chemistry of Materials vol. 23, No. 15, 2011, pp. 3404-3407.

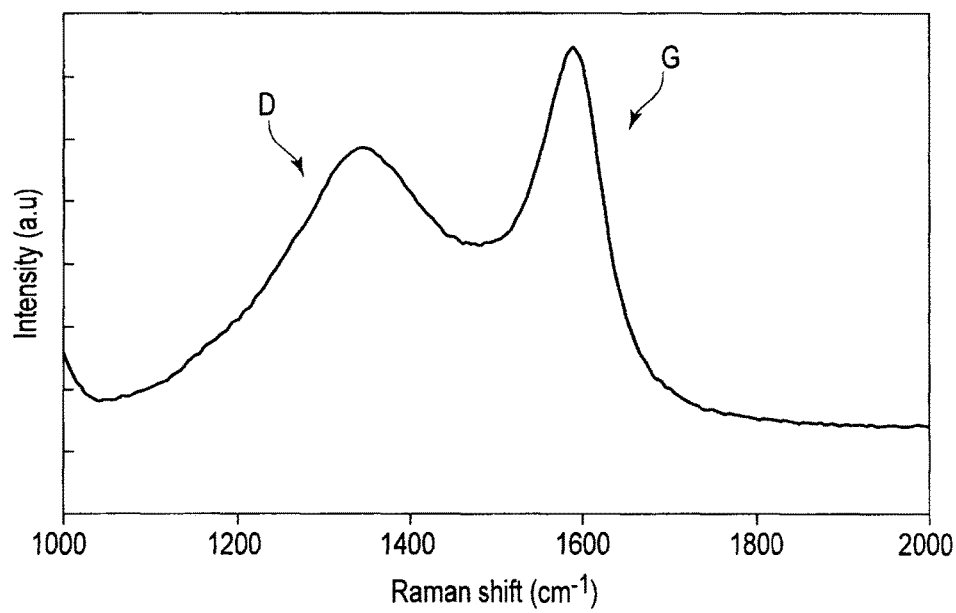
F I G. 9
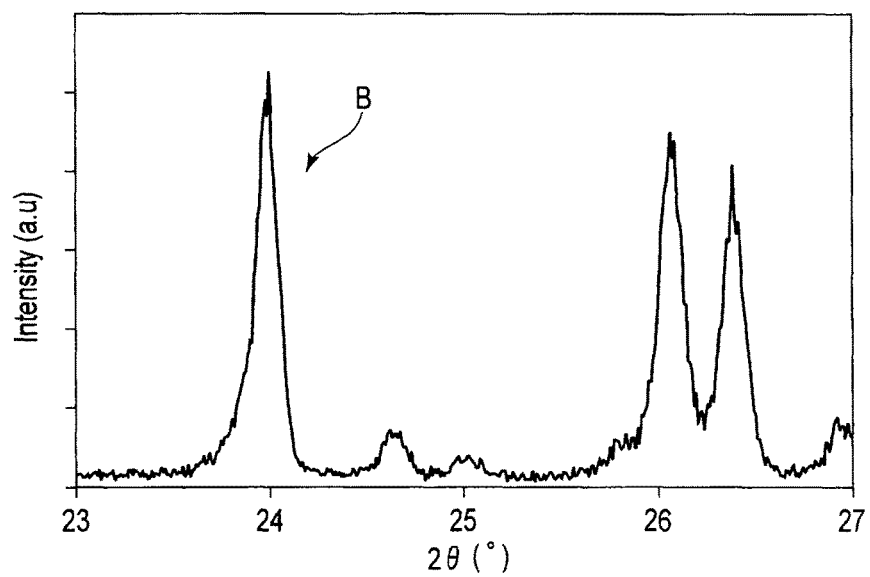
F I G. 10

… (1)

ACTIVE SUBSTANCE, NONAQUEOUS ELECTROLYTE BATTERY, AND BATTERY PACK

CROSS-REFERENCE TO RELATED APPLICATIONS

This application is based upon and claims the benefit of priority from the Japanese Patent Applications No. 2013-196142, filed Sep. 20, 2013; and No. 2014-177123, filed Sep. 1, 2014, the entire contents of all of which are incorporated herein by reference.

FIELD

Embodiments described herein relate generally to an active substance, a method for manufacturing an active substance, a nonaqueous electrolyte battery and a battery pack.

BACKGROUND

Recently, a nonaqueous electrolyte battery such as a lithium-ion secondary battery has been developed as a battery having a high energy density. The nonaqueous electrolyte battery is expected to be used as a power source for vehicles such as hybrid vehicles or electric cars or a large-sized power source for electricity storage. Particularly, for use in vehicles, the nonaqueous electrolyte battery is desired to have other performances such as rapid charge and discharge performances and long-term reliability. A nonaqueous electrolyte battery enabling rapid charge and discharge not only remarkably shortens the charging time but also makes it possible to improve performances related to the motive force of a hybrid vehicle and to efficiently recover regenerative energy.

In order to enable rapid charge and discharge, it is necessary for electrons and lithium ions to be able to migrate rapidly between the positive electrode and the negative electrode. When a battery using a carbon based material in the negative electrode undergoes repeated rapid charge and/or discharge, dendrite precipitation of metal lithium occurs on the electrode. Dendrites cause internal short circuits, which can lead to heat generation and fires.

In light of this, a battery using a metal composite oxide as a negative electrode active material in place of a carbonaceous material has been developed. Particularly, in a battery using titanium oxide as the negative electrode active material, rapid charge and discharge can be performed stably. Such a battery also has a longer life than those using a carbonaceous material.

However, a battery using titanium oxide has a problem in that the battery has low energy density due to the reason described below.

At first, titanium oxide has a higher (nobler) potential relative to metal lithium than that of the carbonaceous material. For example, a lithium-absorption and release potential of titanium oxide is 1.5 V based on metal lithium. The potential of titanium oxide is due to the redox reaction between $Ti^{3+}$ and $Ti^{4+}$ when lithium is electrochemically absorbed and released. Therefore, it is limited electrochemically. Further, there is the fact that rapid absorption and release of lithium ions can be stably performed at an electrode potential as high as about 1.5 V. Therefore, it is substantially difficult to drop the potential of the electrode to improve energy density.

Further, titanium oxide has a lower capacity per weight. As to the capacity of the battery per unit weight, the theoretical capacity of a lithium-titanium composite oxide such as $Li_4Ti_5O_{12}$ is about 175 mAh/g. On the other hand, the theoretical capacity of a general graphite-based electrode material is 372 mAh/g. Therefore, the capacity density of titanium oxide is significantly lower than that of the carbon-based negative electrode. This is due to a reduction in substantial capacity because there are only a small number of lithium-absorption sites in the crystal structure and lithium tends to be stabilized in the structure.

In view of such circumstances, a new electrode material containing Ti and Nb has been examined. Particularly, a composite oxide represented by $TiNb_2O_7$ has been a focus of attention. This is because during the Li-absorption into this compound, charge compensation, in which Ti changes from tetravalence to trivalence and Nb changes pentavalence to trivalence, takes place, thereby the compound has a theoretical capacity of 387 mAh/g, and can exhibit a high capacity.

BRIEF DESCRIPTION OF THE DRAWINGS

FIG. 9 is a Raman spectrum for Example 1;

FIG. 10 is a wide-angle X-ray diffraction pattern for Example 1;

DETAILED DESCRIPTION

In general, according to one embodiment, there is provided an active substance. The active substance includes particles of niobium titanium composite oxide and a phase including a carbon material. The niobium titanium composite oxide is represented by $Ti_{1-x}M1_xNb_{2-y}M2_yO_7$. In this formula, $0 \leq x < 1$, $0 \leq y < 1$, and each of an element M1 and an element M2 is at least one selected from the group consisting of Nb, V, Ta, Fe, Ti, Bi, Sb, As, P, Cr, Mo, W, B, Na, Mg, Al, and Si, and the element M1 and the element M2 are identical or different from each other. The phase is formed on at least a part of the surface of the particles. The carbon material shows, in a Raman chart obtained by Raman spectrometry using a 532-nm measuring light source, a G band observed at from 1530 to 1630 $cm^{-1}$ and a D band observed at from 1280 to 1380 $cm^{-1}$. A ratio $I_G/I_D$ between a peak intensity $I_G$ of the G band and a peak intensity $I_D$ of the D band is from 0.8 to 1.2.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be appropriately changed taking the following explanations and known technologies into consideration.

First Embodiment

According to a first embodiment, there is provided an active substance. The active substance includes particles of niobium titanium composite oxide and a phase including a carbon material. The niobium titanium composite oxide is represented by $Ti_{1-x}M1_xNb_{2-y}M2_yO_7$. In this formula, $0 \leq x < 1$, $0 \leq y < 1$, and each of an element M1 and an element M2 is at least one selected from the group consisting of Nb, V, Ta, Fe, Ti, Bi, Sb, As, P, Cr, Mo, W, B, Na, Mg, Al, and Si, and the element M1 and the element M2 are identical or different from each other. The phase is formed on at least a part of the surface of the particles. The carbon material shows, in a Raman chart obtained by Raman spectrometry using a 532-nm measuring light source, a G band observed at from 1530 to 1630 cm$^{-1}$ and a D band observed at from 1280 to 1380 cm$^{-1}$. A ratio $I_G/I_D$ between a peak intensity $I_G$ of the G band and a peak intensity $I_D$ of the D band is from 0.8 to 1.2.

For reasons to be described below, a niobium titanium composite oxide can realize an active material having excellent rapid charge and discharge performance and a high energy density.

First, the niobium titanium composite oxide can show a high energy density for reasons to be described below with reference to FIGS. 1 and 2.

Figure 1:
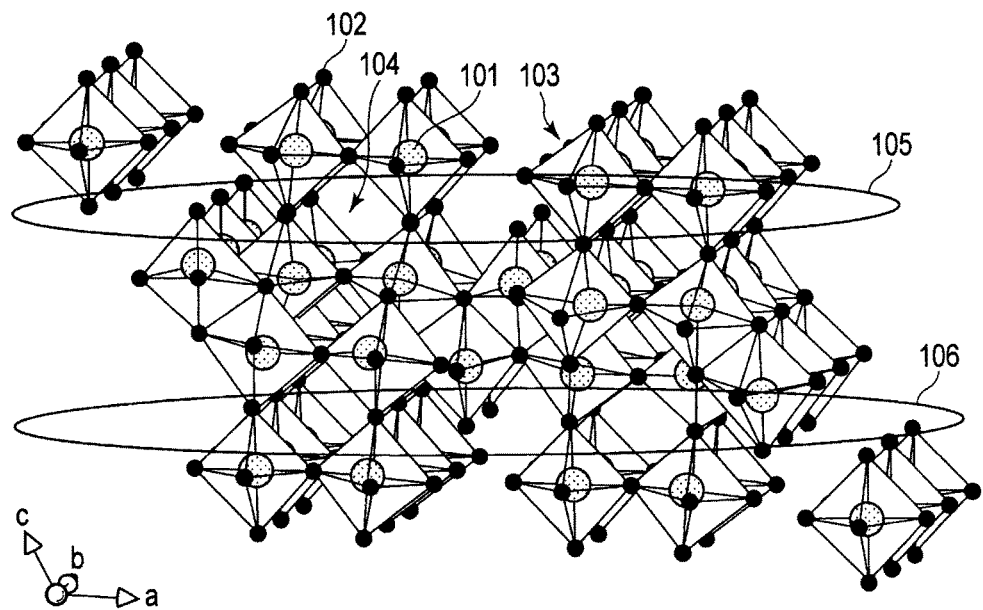
FIG. 1 is a pattern diagram showing a crystal structure of monoclinic $TiNb_2O_7$.
Figure 2:
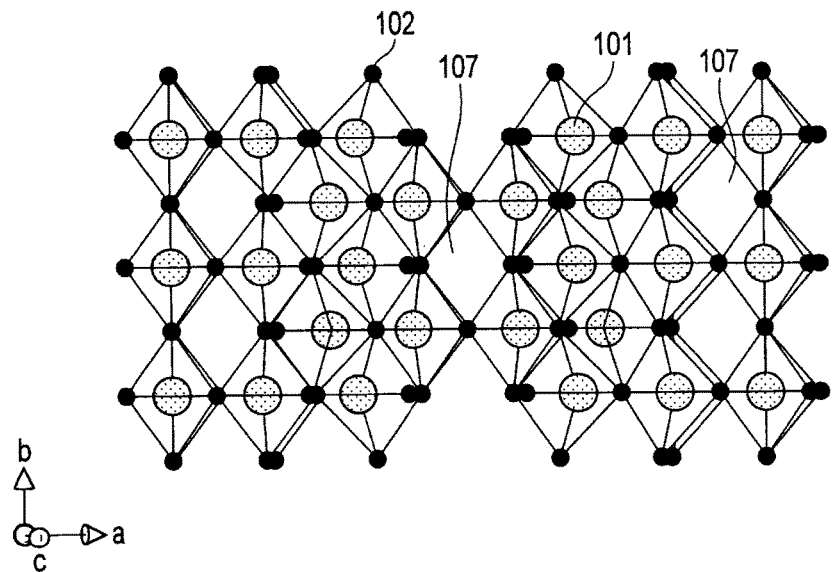
FIG. 2 is a pattern diagram of the crystal structure of FIG. 1 as seen from another direction.

FIG. 1 is a pattern diagram showing a crystal structure of monoclinic $TiNb_2O_7$. FIG. 2 is a pattern diagram of the crystal structure of FIG. 1 as seen from another direction.

The niobium titanium composite oxide $TiNb_2O_7$ wherein x is 0 in Formula above may have, for example, a monoclinic crystal structure.

As shown in FIG. 1, in the crystal structure of monoclinic $TiNb_2O_7$, a metal ion 101 and oxide ions 102 constitute a skeletal structure 103. Nb and Ti ions are randomly arranged in the location of the metal ions 101 of each of the skeletal structures at a Nb/Ti ratio of 2:1. The skeletal structures 103 are arranged three-dimensionally alternately, and voids 104 are present between the skeletal structures 103. The void 104 serves as a host of a lithium ion.

In FIG. 1, areas 105 and 106 are portions with two-dimensional channels in directions [100] and [010]. As shown in FIG. 2, in the crystal structure of monoclinic $TiNb_2O_7$, a void 107 is present in a direction [001]. The void 107 has a tunnel structure advantageous for the conduction of lithium ions and serves as a conduction path connecting the areas 105 and 106 in a [001] direction. Therefore, lithium ions can go back-and-forth between the areas 105 and 106 through the conduction path.

Thus, $TiNb_2O_7$ with a monoclinic crystal structure has an equivalently large space into which lithium ions are absorbed and has a structural stability. Further, $TiNb_2O_7$ with a monoclinic crystal structure has two-dimensional channels enabling rapid diffusion of lithium ions and conduction paths connecting these channels in the direction [001]. Then, the lithium ions are absorbed into and released from the absorption spaces effectively, and the absorption and release spaces for lithium ions are effectually increased. Thus, $TiNb_2O_7$ with a monoclinic crystal structure can provide a high capacity and high rate performance.

When lithium ions are absorbed in the void 104, the metal ion 101 constituting the skeleton is reduced to a trivalent one, thereby maintaining electroneutrality of the crystal structure of $TiNb_2O_7$. In a niobium titanium composite oxide of this embodiment, not only is a Ti ion reduced from tetravalent to trivalent but also an Nb ion is reduced from pentavalent to trivalent. Because of this, the number of reduced valences per active material weight is large. Therefore, the electroneutrality of the crystal can be maintained, even if many lithium ions are absorbed. Therefore, the energy density of the oxide is higher than that of a compound only containing a tetravalent cation, such as titanium oxide. The theoretical capacity of the niobium titanium composite oxide of this embodiment is about 387 mAh/g and is more than twice the value of titanium oxide having a spinel structure.

The niobium titanium composite oxide has a lithium absorption potential of about 1.5 V (vs. Li/Li$^+$). Therefore, a battery which is excellent in rate performance and is capable of stably repeating rapid charge and discharge can be provided by using the active material.

Subsequently, the niobium titanium composite oxide represented by Chemical formula: $Ti_{1-x}M1_xNb_{2-y}M2_yO_7$ will be described in detail.

In the niobium titanium composite oxide included in the active material according to the first embodiment, the molar ratio of the Ti element to the Nb element may be beyond 1:2.

For example, the niobium titanium composite oxide included in the active material according to the first embodiment may include the Nb element in an amount larger than 2 mol based on 1 mol of the Ti element. The compound may be, for example, one in which a part of the Ti element of the compound $TiNb_2O_7$ is replaced with the Nb element. Alternatively, the niobium titanium composite oxide included in the active material according to the first embodiment may contain the Nb element in an amount smaller than 2 mol based on 1 mol of the Ti element. The compound may be, for example, one in which a part of the Nb element of the compound $TiNb_2O_7$ is replaced with the Ti element.

The niobium titanium composite oxide included in the active material according to the first embodiment may include metallic elements other than the Ti and Nb elements. Examples of the metallic elements other than the Ti and Nb elements may include V, Ta, Fe, Bi, Sb, As, P, Cr, Mo, W, B, Na, Mg, Al, and Si. These elements may be replaced with a part of the Ti element of the compound $TiNb_2O_7$ and/or a part of the Nb element of the compound $TiNb_2O_7$.

Therefore, the niobium titanium composite oxide in the active material particles included in the active material according to the first embodiment can be expressed by the formula: $Ti_{1-x}M1_xNb_{2-y}M2_yO_7$ ($0 \leq x < 1$, $0 \leq y < 1$). "M1" in the general formula means an element substituted for a part of the Ti element in the composition formula: $TiNb_2O_7$. "M2" in the formula of the compound in the active material particles contained in the active material according to the first embodiment means an element substituted for a part of the Nb element in the composition formula: $TiNb_2O_7$. The elements M1 and M2 may be at least one selected from the group consisting of Nb, V, Ta, Fe, Ti, Bi, Sb, As, P, Cr, Mo, W, B, Na, Mg, Al, and Si. The elements M1 and M2 may be identical or may be different from each other.

It is expected that the capacity of the active material particles included in the active material according to the first embodiment can be further improved by partially substituting the Ti element in the niobium titanium composite oxide $TiNb_2O_7$ for the element M1 and/or partially substituting the Nb element for the element M2. For example, when V, Ta, Bi, Sb, As or P is used as a substituted element, a part of the Nb element may be substituted and a part of the Ti element can be substituted. Since these elements are pentavalent, the electronic conductivity of the compound $TiNb_2O_7$ can be improved by substituting a part of the Ti element. Due to this substitution, it is expected that the capacity and rapid charge performance can be further improved. A hexavalent element such as Cr, Mo or W can substitute a part of the Nb element. Due to this substitution, the improvement of the electron conductivity of the compound $TiNb_2O_7$ is expected. The elements such as B, Na, Mg and Si are elements lighter than the Ti element. Thus, it is expected that if a part of the Ti element is substituted for these elements, the capacity can be further improved. A trivalent element such as Fe or Al can substitute a part of the Ti element. Due to this substitution, the improvement of the electron conductivity of the compound $TiNb_2O_7$ is expected.

Even if a part of the Nb element is substituted for Ta in the compound $TiNb_2O_7$, equivalent characteristics can be obtained. This is attributed to the fact that Ta is a material included in the columbite (i.e., a mineral ore including Nb), and Nb and Ta have the same physical, chemical, and electrical properties.

Further, it is expected that the effects of the added elements such as Mo, W, and V as sintering aids decrease the sintering temperature at the time of production.

The niobium titanium composite oxide in the active material particles contained in the active substance according to the first embodiment can be also represented by the formula: $Ti_{1-x}M_xNb_2O_7$ ($0 \leq x < 1$).

"M" in chemical formula: $Ti_{1-x}M_xNb_2O_7$ means an element partially substituted with the Ti element in $TiNb_2O_7$ having the structure described above. It is expected that the capacity can be further improved by partially substituting the Ti element in the compound $TiNb_2O_7$ with the element M. For example, when Nb, V, Ta, Bi, Sb, As, P, Cr, Mo or W is used as the element M, each of the elements is pentavalent or hexavalent. Thus, it is expected that the capacity and rapid charge performance can be further improved by improving the electron conductivity of the active material. The elements such as B, Na, Mg, Al, and Si are elements lighter than the Ti element. Thus, it is expected that if a part of the Ti element can be substituted by these elements, the capacity can be further improved.

The content of the element M1 and M2 in the compound represented by Chemical formula: $Ti_{1-x}M1_xNb_{2-y}M2_yO_7$ and the content of the element m in the compound represented by Chemical formula: $Ti_{1-x}M_xNb_2O_7$ can be quantified, for example, by ICP spectroscopic analysis.

The compound represented by Formula: $Ti_{1-x}M1_xNb_{2-y}M2_yO_7$ ($0 \leq x < 1$, $0 \leq y < 1$) can be represented by Formula: $Ti_{1-x}M1_xNb_{2-y}M2_yO_{7+\delta}$ ($0 \leq x < 1$, $0 \leq y < 1$, $-0.3 \leq \delta \leq 0.3$).

Oxygen deficiency may occur in a raw material or an intermediate product during preparation of a composite oxide. In some cases, inevitable impurities contained in the raw material as well as impurities mixed therein during the preparation are present in the prepared composite oxide. Thus, the niobium titanium composite oxide, may contain, for example, an oxide having the composition beyond the stoichiometric mixture ratio represented by Formula: $Ti_{1-x}M1_xNb_{2-y}M2_yO_7$ ($0 \leq x < 1$, $0 \leq y < 1$) due to the inevitability factor. For example, due to the oxygen deficiency which occurs during the preparation of the oxide, an oxide having the composition represented by Formula $Ti_{1-x}M1_xNb_{2-y}M2_yO_{7+\delta}$ ($0 \leq x < 1$, $0 \leq y < 1$, $-0.3 \leq \delta < 0$) may be prepared.

The compound represented by Formula: $Ti_{1-x}M1_xNb_{2-y}M2_yO_7$ ($0 \leq x < 1$, $0 \leq y < 1$) may include not a uniform single phase that contains $TiNb_2O_7$ at the time of sintering, but different phases with different Nb/Ti ratios. Examples of the different phases include Rutile type $TiO_2$, $Nb_{24}TiO_{62}$, $Nb_{14}TiO_{37}$, and $Nb_{10}Ti_2O_{29}$.

However, even the oxide having the composition beyond the stoichiometric mixture ratio due to the inevitability factor as well as an oxide including different phases can show excellent Li ion absorption stability. Thus, a niobium titanium composite oxide which contains the oxide having the composition beyond the stoichiometric mixture ratio due to the inevitable factor can exert the same effect as that of a niobium titanium composite oxide having the composition represented by Formula: $Ti_{1-x}M1_xNb_{2-y}M2_yO_7$ ($0 \leq x < 1$, $0 \leq y < 1$).

For the above reason, the niobium titanium composite oxide included in the active substance according to this embodiment includes the oxide having the composition beyond the stoichiometric mixture ratio represented by Formula: $Ti_{1-x}M1_xNb_{2-y}M2_yO_7$ ($0 \leq x < 1$, $0 \leq y < 1$) due to the inevitable factor.

An active substance according to a first embodiment contains a phase which contains a carbon material, and the phase is formed on at least a part of the surface of the niobium titanium composite oxide particles.

When the carbon material is analyzed by Raman spectrometry using a 532-nm measuring light source, the crystallinity of the carbon material can be determined. In a Raman spectrum chart of the carbon material, a G band observed near 1580 cm$^{-1}$ is a peak originated from a graphite structure, and a D band observed near 1330 cm$^{-1}$ is a peak originated from a defect structure of carbon. The G and D bands may be shifted by ±50 cm$^{-1}$ from the positions of 1580 cm$^{-1}$ and 1330 cm$^{-1}$, respectively due to various factors.

A carbon material in which a ratio $I_G/I_D$ between a peak intensity $I_G$ of the G band and a peak intensity $I_D$ of the D band in a Raman spectrum chart is from 0.8 to 1.2 means that the carbon material has favorable crystallinity of graphite. The carbon material can have excellent conductivity.

If the ratio $I_G/I_D$ is larger than 1.2, it means that, for example, there is insufficient amorphization. In this case, impurities in the carbon source may be included. The impurities facilitate a side reaction with a nonaqueous electrolyte, and thus they have a negative impact on rate and cycle characteristics of a nonaqueous electrolyte battery.

Alternatively, if the reaction of the carbon source with the Nb element contained in $Ti_2NbO_7$ proceeds, an amorphous carbon component having a carbon-carbon bond more unstable than that of the graphite structure is oxidized preferentially. As a result, the amount of amorphous carbon is decreased and the ratio $I_G/I_D$ may become larger than 1.2.

If the ratio $I_G/I_D$ is smaller than 0.8, it means that the content of the carbon component originated from the graphite structure is low. In this case, favorable electron conductivity cannot be obtained.

Since the active substance according to the first embodiment contains the phase which includes niobium titanium composite oxide particles and a carbon material as described above, the active substance can realize a nonaqueous electrolyte battery excellent in rate characteristics and cycle characteristics.

In the active substance according to the first embodiment, an intensity ratio $I_A/I_B$ between a peak A and a peak B is preferably 0.25 or less in a spectrum obtained by wide-angle X-ray scattering measurement using CuKα rays. Here, the peak A is a peak attributed to a crystal structure of a tetragonal oxide comprising a tetravalent niobium, such as $NbO_2$ and is present at the position of $2\theta=26.37°$ to $26.77°$ while the peak B is a peak attributed to a crystal structure of a monocyclic oxide $TiNb_2O_7$ and is present at the position of $2\theta=23.76$ to $24.16°$. The active substance having a ratio $I_A/I_B$ of 0.25 or less means that the content of $NbO_2$ (i.e., an impurity in the niobium titanium composite oxide) is low and can exhibit a higher active material capacity. Further, when the active substance is used for a nonaqueous electrolyte battery, charge and discharge rate characteristics can be further improved. Ideally, the ratio $I_A/I_B$ is nearly 0.

Since the oxide $NbO_2$ includes Nb as tetravalent cation, the oxide $NbO_2$ has a higher electron-conductivity as compared to that of $TiNb_2O_7$. Therefore, if the oxide $NbO_2$ is included in the active substance according to the first embodiment in small amount, the improved electron-conductivity can be obtained. Due to this, the improvement of the rate characteristics and the cycle characteristics are expected.

The ionic radius of the tetravalent Ti element is closed to that of the tetravalent Nb element. Therefore, when $Nb_2TiO_7$ is decomposed to precipitate $NbO_2$, Ti element may be arranged in the site of Nb in the crystal structure. Thus, in this description, a phase having a same crystal structure as $NbO_2$ may include Ti element. That is, it can be presented by the chemical formula: $Nb_{(3-x)/3}Ti_{x/3}O_2$ ($0<x<1$). The ionic radius of the tetravalent Ti element is smaller compared to that of the tetravalent Nb element. Therefore, if Ti element is included in the Nb site of the composite oxide in a large amount, the lattice of the composite oxide is shrunk. For example, the composite shows the peak present at the location sifted by 0.4° to 0.6° from the peak location for $NbO_2$ described in Powder Diffraction File Level-II card (PDF-2 card) 9-235. Thus, the peak A, which is attributed to a crystal structure of a tetragonal oxide comprising a tetravalent niobium, present at the position of $2\theta=26.37°$ to $26.77°$.

The average particle size of the niobium titanium composite oxide particles is not particularly limited, and it may be changed according to desired battery characteristics. However, the particle size is preferably made smaller in order to improve the diffusibility of lithium. The average particle size is preferably from 0.1 to 10 μm, more preferably from 0.1 to 1 μm. The niobium titanium composite oxide particles may be in the form of granulated particles such as secondary particles.

The BET specific surface area of the niobium titanium composite oxide particles is not particularly limited and is preferably 5 $m^2/g$ or more and less than 200 $m^2/g$. If the specific surface area is within the above range, the necessary contact area with the nonaqueous electrolyte can be sufficiently ensured, excellent discharge rate performance is easily obtained, and the charging time can be reduced. Further, if the specific surface area is within the above range, the reactivity with the nonaqueous electrolyte does not become too high, lifetime characteristics can be improved, and coating properties of a slurry containing the active material to be used in the following production of an electrode can be improved.

The phase including a carbon material in various forms can be present in the active substance according to the first embodiment. For example, the phase including a carbon material may cover all the niobium titanium composite oxide particles or may be supported by a part of the surface of the niobium titanium composite oxide particles. More preferably, the whole surface of the niobium titanium composite oxide particles is covered with the phase containing a carbon material from two viewpoints of uniformly compensating the overall conductivity of the active substance and suppressing a surface reaction of the active substance and the nonaqueous electrolyte. The presence of the phase including a carbon material can be confirmed by mapping based on, for example, transmission electron microscope (TEM) observation or energy dispersive X-ray spectrometry (EDX).

The active substance according to the first embodiment can be produced by, for example, the method of producing an active substance according to the second embodiment.

Subsequently, Raman spectrometry, wide-angle X-ray scattering measurement, and measurement of particle size distribution and specific surface area as for the active substance according to the first embodiment will be described.

<Raman Spectrometry>

In a quantitative evaluation procedure of the crystallinity of the carbon component included in the active substance, a micro Raman measurement device may be used. As the micro Raman device, for example, ALMEGA, manufactured by Thermo Fisher Scientific may be used. Regarding to the conditions of the measuring, for example, a wavelength of light source may be set to 532 nm, a slit size may be set to 25 μm, a laser intensity may be set to 10%, an exposure time may be set to 5 s, and a cumulative number may be to 10.

The Raman spectrometry can be performed by, for example, the following procedure.

When an active substance incorporated into a battery is evaluated, the battery is put into a state in which lithium ions are perfectly released. For example, when the active substance is used as a negative electrode active material, the battery is put into a fully discharged state. However, there is the case where a small amount of lithium ions remains even in the discharged state.

Next, the battery is disintegrated in a glove box filled with argon. Then, the electrode is washed with an appropriate solvent. In this case, it is preferable to use, for example, ethyl methyl carbonate. Subsequently, the active material is peeled from the washed electrode, and a sample is collected.

The collected sample is used to perform the Raman spectrometry under the conditions described above.

In the measurement process, the presence or absence of the Raman activity of a current collector and other components included in ingredients such as a conductive agent and a binder as well as their peak positions are grasped. When the peak positions are overlapped with each other, it is necessary to separate the peaks related to components other than the active substance.

When the active substance is mixed with the conductive agent in the electrode, it may be difficult to distinguish between the carbon material included in the active substance and the carbon material which is incorporated into the electrode as the conductive agent. In such a case, one method of distinguishing between both the materials is a method comprising: dissolving a binder in a solvent; removing it; subjecting the resulting product to centrifugation; then taking out the active substance having a large specific gravity. The active substance can be separated from the conductive agent by the above method. Thus, the carbon material contained in the active substance can be measured in a state of being contained therein.

Alternatively, it is possible to use a procedure comprising: performing mapping using the spectral component originated from the active substance obtained by microscopic Raman spectroscopy; separating the component of the conductive agent and the component of the active substance using the result of the mapping; extracting only the Raman spectrum corresponding to the component of the active substance; and evaluating it.

<Wide-Angle X-Ray Scattering Measurement>

Wide-angle X-ray scattering measurement can be performed by, for example, the following procedure.

First, a sample to be measured is ground until the average particle size becomes 5 µm or less. As a sample stand, for example, a glass sample plate with a holder portion having a depth of 0.2 mm is used. The holder portion is filled with the sample, and the surface of the sample is flattened by sufficiently pressing a glass plate to the sample. The glass sample plate filled with the sample is measured on a powder X-ray diffractometer using Cu-Kα radiation. When the peak intensity ratio is measured, processes such as removal of a background, and separation, smoothing, and fitting of peaks of Kα1 and Kα2 are not performed in order to avoid errors in estimation due to data processing. The peak intensity ratio is calculated from the maximum value of intensities of the peaks of measured data including the measured Kα1 and Kα2 lines.

When the wide-angle X-ray diffraction measurement is performed on the active substance contained in the electrode, it can be performed, for example, as follows.

In accordance with the procedure described in Raman spectrometry, a nonaqueous electrolyte battery is first disassembled and then an electrode is taken out from the battery. Then, a sample is corrected from the electrode.

The collected sample is used to perform wide-angle X-ray scattering measurement under the conditions described above.

In the measurement process, peaks originated from a current collector and ingredients such as a conductive agent and a binder are previously measured by wide-angle X-ray scattering so as to grasp the positions of the peaks originating from them. When the peak positions are overlapped with each other, it is necessary to separate the peaks related to components other than the active substance.

<Measurement of Particle Size Distribution>

The average particle size of the active substance can be obtained, for example, from particle size distribution (weight-basis distribution).

The particle size distribution of the active substance, for example, in the case of a powder, can be obtained by measurement with a laser diffractometer. For example, the particle size distribution using the laser diffractometer is measured and the weight distribution (% by weight) is calculated. At this time, aggregation may be prevented by vibrating with ultrasonic waves. The measurement conditions are conditions for each material based on the laser diffractometer manufacturer's recommendations. At this time, in the case where a material to be measured is an electrode, the electrode, which is cut if appropriate, is immersed in a solvent (preferably an organic solvent such as alcohol or NMP) and ultrasonic waves are applied thereto in order to take out the active substance. As a result, it is possible to peel the electrode material layer from the current collector foil. Then, the electrode material layer thus peeled is put into a dispersing solvent and the dispersion is subjected to centrifugation. As a result, it is possible to separate only the active substance from the powder of the electrode material layer containing a conductive agent such as carbon.

Alternatively, when there are pre-existing materials other than the active material (such as carbon, a current collector, and a binder), it is preferable that a powder from which these materials are removed is prepared in advance and the preliminary measurement is performed on it so as to exclude the result thereof from the measurement results.

<Measurement of Specific Surface Area>

The specific surface area is measured using, for example, a method in which molecules whose adsorption occupied area is known are allowed to adsorb to the plane of powder particles at the temperature of liquid nitrogen to find the specific surface area of the sample from the amount of the adsorbed molecules. The most frequently used method is a BET method based on the low temperature and low humidity physical adsorption of an inert gas. The BET method is well known as a method for calculating the specific surface area, and is based on an extension of the Langmuir theory, in which monolayer adsorption is extended to multilayer adsorption. The specific surface area determined by the BET method is called the "BET specific surface area".

The active substance according to the first embodiment includes niobium titanium composite oxide particles and a phase including a carbon material which shows a Raman spectrum chart in which a ratio $I_G/I_D$ between a peak intensity $I_G$ of the G band and a peak intensity $I_D$ of the D band is from 0.8 to 1.2. This active substance can realize a nonaqueous electrolyte battery excellent in rate characteristics and cycle characteristics.

Second Embodiment

According to a second embodiment, there is provided a method for manufacturing an active substance. The method includes providing active material particles including niobium and titanium; forming a phase which includes a carbon-containing compound on the surface of the active material particles so as to produce a composite including the active material particles and the phase including the carbon-containing compound; and sintering the composite at a temperature of 650° C. or more and less than 900° C. in an inert gas atmosphere.

A composite comprising active material particles containing niobium and titanium and a phase which includes a carbon-containing compound is sintered at the temperature of 650° C. or more and less than 900° C. in an inert gas atmosphere so that the phase which includes a carbon-containing compound can be converted to a phase including a carbon material with high crystallinity. The carbon material with high crystallinity is included so that the active substance obtained by the manufacturing method according to the second embodiment can exhibit high electrical conductivity.

Further, the composite is sintered in the above-described temperature range so that other components such as hydrogen which may be contained in the phase including a carbon-containing compound can be removed. When an active substance containing a small amount of impurities or an active substance containing no impurities is used for a nonaqueous electrolyte battery, it is possible to prevent the side reaction of the nonaqueous electrolyte from proceeding.

Further, the composite is sintered in the above-described temperature range so that it is possible to prevent carbon in the carbon-containing compound from serving as a reductant. As a result, the reductive decomposition of the surface of the active material particles is suppressed. Thus, the formation of $NbO_2$ can be reduced.

These results show that, according to the manufacturing method according to the second embodiment, there can be provided an active substance capable of realizing a nonaqueous electrolyte battery excellent in rate characteristics and cycle characteristics.

If the composite is sintered at the temperature less than 650° C., it is not possible to sufficiently improve the crystallinity of the carbon material. Thus, it is not possible to sufficiently ensure electrical conductivity. If the composite is sintered at the temperature less than 650° C., it is not possible to remove other components in the carbon-containing compound. If the components remain, the side reaction with the nonaqueous electrolyte may proceed. Therefore, a nonaqueous electrolyte battery which includes an active substance produced by performing the sintering at less than 650° C. exhibits poor rate characteristics and poor cycle life.

If the composite is sintered at a temperature higher than 900° C., carbon serves as a reductant, causing reductive decomposition of the surface of the active material particles. As a result, $NbO_2$ is formed. A nonaqueous electrolyte battery including an active substance in which $NbO_2$ is present at an interface between active material particles and a carbon material is inferior in active material capacity and rate characteristics. In this case, the reaction of the carbon source with the Nb element contained in $Ti_2NbO_7$ proceeds, and then an amorphous carbon component having a carbon-carbon bond more unstable than that of the graphite structure is oxidized preferentially. Accordingly, the amount of amorphous carbon is decreased.

The composite is preferably sintered in a temperature ranging from 700° C. to 800° C.

The state of the phase of a carbon-containing compound which is formed on the surface of the active material particles including niobium and titanium is not particularly limited. The phase may cover all the active material particles or may be supported by a part of the surface of active material particles. More preferably, the entire surface of the active material particles is covered with the phase of a carbon-containing compound in aspects of both uniformly compensating the overall conductivity of the active substance produced by the manufacturing method according to the second embodiment and suppressing a reaction with the nonaqueous electrolyte on the surface of the active material particles. The content of the phase of a carbon-containing compound in the composite including active material particles and a phase of a carbon-containing compound is preferably from 0.1 to 10% by weight, and more preferably from 1 to 3% by weight with respect to the active material particles. If it is set to the above range, a decrease in diffusibility of Li due to an increase in interface resistance can be prevented and sufficient conductivity can be compensated.

The carbon-containing compound is preferably a cyclic organic compound containing two or more cyclic structures of carbon skeletons. Examples of the compound include saccharides such as sucrose, maltose, and glucose; saccharides, polyolefins, nitriles, alcohols, organic compounds containing a benzene ring; and aromatic hydrocarbons such as pyrene, naphthalene, and chrysene. Since the cyclic organic compounds are structurally similar to that of graphite, these compounds are easily carbonized when sintering in a reduction atmosphere. Thus, a phase which includes such compounds can be converted to a carbon material with favorable conductivity.

From the viewpoint of cost for mass production, the inert gas to be used in sintering a composite is at least one selected from the group consisting of nitrogen and carbon dioxide.

The active material particles including niobium and titanium are preferably prepared by a method including: preparing a precursor containing a titanium compound and a niobium compound; and sintering the precursor in a temperature ranging from of 700° C. to 1400° C. A specific example of the method of preparing active material particles will be described in detail in the later.

Any one of $TiNb_2O_7$, $Ti_2Nb_{10}O_{29}$, and $TiNb_{24}O_{62}$ phases, which are crystal phases of niobium titanium composite oxide, is formed by sintering the precursor. In some cases, rutile type titanium dioxide $TiO_2$ may be formed by sintering the precursor. The type of phase to be formed depends on the composition ratio of the niobium element to the titanium element in the precursor.

These phases are formed so that the crystal stability of the active material particles can be improved in advance before sintering the composite, and the reduction stability of the Nb element can be ensured. Therefore, it is possible to prevent an impurity phase such as $NbO_2$ from being formed when sintering the composite. On the other hand, if the formation of the crystal phase is insufficient in the sintering of the precursor, the reduction stability of the niobium element is decreased in the sintering of the composite and an impurity phase such as $NbO_2$ may be easily formed.

Before sintering the composite in an inert gas atmosphere, the active material particles or the composite may be subjected to mechanical grinding such as ball milling or bead milling in order to obtain fine particles.

However, it is preferable that when the mechanical grinding is performed, the grinding time is minimized so as to minimize impairment of the crystallinity of the active material particles, or the annealing treatment is performed to improve the crystallinity after the mechanical grinding. When the annealing treatment is performed, the treatment temperature is preferably in a range of 700° C. to 900° C. The annealing is performed at such temperature so that the crystallinity can be improved while preventing the particles from becoming coarser. The annealing time is preferably from 1 hour to 2 hours. In this regard, the annealing step is aimed at improving the crystallinity of the active material particles. The sintering of the precursor may also serve as the annealing process.

It is preferable that the mechanical grinding is performed so as not to impair the crystallinity of the active material particles and the annealing treatment is performed after the mechanical grinding. The reason therefor will be described below.

If the sintering (at 1000° C. for 12 hours or more) is performed by the solid-phase method in order to produce a niobium titanium composite oxide, coarse particles may grow easily. Therefore, when the solid-phase method is used, mechanical grinding such as ball milling or bead milling may be performed in order to obtain fine particles having a primary particle diameter of 1 μm or less, which are generally used for battery materials. The present inventors have found the following facts. If a niobium titanium composite oxide microparticulated by performing the mechanical grinding excessively is covered with a carbon-containing compound and then sintered at a temperature higher than 550° C., carbon functions as a reductant and thus $NbO_2$ is formed near the contact interface of carbon-active material particles. As a result, there is a problem such that the active material capacity and charge and discharge rate characteristics are decreased. The present inventors have found that the cause of the formation of $NbO_2$ is that an irregular crystal structure significantly appears on the surface of the active material particles by excessively performing ball milling or bead milling as described above, whereby the formation of $NbO_2$ is facilitated.

The present inventors have performed repeated research in light of such discovery. As a result, they have found that the formation of $NbO_2$ can be suppressed and the sintering temperature can be further improved by modifying the active material particles containing niobium and titanium to active material particles having sufficient crystallinity, when sintering and carbonizing the carbon-containing compound. Due to the aforementioned reason, it is preferable that the mechanical grinding is performed so as not to impair the crystallinity of the active material particles and the annealing treatment is performed after the mechanical grinding.

According to the manufacturing method according to the second embodiment, it is possible to produce an active substance including the niobium titanium composite oxide represented by, for example, $Ti_{1-x}M1_xNb_{2-y}M2_yO_7$ (wherein $0 \leq x < 1$, $0 \leq y < 1$ and each of an element M1 and M2 is at least one selected from the group consisting of Nb, V, Ta, Tl, Fe, Bi, Sb, As, P, Cr, Mo, W, B, Na, Mg, Al, and Si, and the element M1 and the element M2 are identical or different from each other). That is, by the manufacturing method according to the second embodiment, the active substance according to the first embodiment can be produced.

Subsequently, an example of the method of preparing active material particles including niobium and titanium will be described.

The active material particles containing niobium and titanium can be produced, for example, by methods such as a solid-phase method, a hydrothermal method, a sol-gel method, and a coprecipitation method, as follows.

1. Solid-Phase Method

The solid-phase method is a method including: weighing and mixing powder raw materials to have a predetermined composition; and performing a heat treatment; and reacting the raw materials each other. An example of the method of producing active material particles including niobium and titanium using the solid-phase method will be described below.

First, starting materials are mixed so that an Nb/Ti ratio is a predetermined molar ratio. The starting materials are not particularly limited. As a Ti-containing compound, for example, titanium oxide and titanium oxyhydroxide may be used. As an Nb-containing compound, niobium oxide, niobium hydroxide and the like may be used. The niobium titanium composite oxide is known to have a plurality of phases, such as $TiNb_2O_7$, $Ti_2Nb_{10}O_{29}$, and $TiNb_{24}O_{62}$. If the particle size of the starting materials is coarse, it takes a long time for the Nb and Ti elements to be uniformly diffused when the Nb and Ti elements are thermally diffused during sintering. Consequently, a plurality of phases such as $TiNb_2O_7$, $Ti_2Nb_{10}O_{29}$, and $TiNb_{24}O_{62}$ may be formed by the concentration gradient. Therefore, the particle size of the starting materials is preferably 5 µm or less, more preferably 1 µm. These materials are mixed by methods such as ball milling, vibration milling, and bead milling. However, the mixing is performed by minimizing the time so as not to impair the crystallinity of powdered materials. The mixing method may be wet-type or dry-type.

Subsequently, the resulting powder is sintered. This sintering corresponds to the sintering of the precursor described above. However, the solid-phase method is a synthesis method which progresses a reaction by thermal diffusion at the interface between the particles of the starting materials. Thus, the sintering is preferably performed at a high temperature. Therefore, the sintering temperature is preferably within a range of 1000° C. to 1400° C. Further, the sintering time is preferably set to 10 hours or more.

Further, the resulting powder is also ground and the step of performing an annealing treatment is performed once or more so that fine-particle crystals having high crystallinity can be produced. The grinding is performed by a method such as wet bead mill grinding. The annealing treatment corresponds to the annealing treatment which is performed to improve the crystallinity as described above. The annealing temperature is preferably from 700° C. to 1100° C., and the annealing time is preferably from 1 hour to 5 hours.

2. Hydrothermal Method

The hydrothermal method is a method including: placing a reacting substance and a solvent or a solution in a closed container called an autoclave; and performing treatment at a high temperature (100° C. or more) and high pressure. An example of the method of producing active material particles containing niobium and titanium using the hydrothermal method will be described below.

First, starting materials are mixed so that an Nb/Ti ratio is a predetermined molar ratio. The starting materials are not particularly limited. For example, solutions which contain hydroxides, sulfides, oxides, salts, alkoxides or organic compounds, each of which contains Ti or Nb, may be used. Examples of the Ti source may include $TiOSO_4$, $TiO_2$, $(NH_4)_2TiO(C_2O_4) \cdot H_2O$, $TiO(OH)_2$, $C_{12}H_{28}O_4Ti$, and $TiCl_4$. Examples of the Nb source include $NbCl_5$, $Nb(OH)_5$, $C_2H_8N_2O_4 \cdot Nb$, and $Nb_2O_5$. Here, the mole ratio at the time of preparing the raw material of Nb/Ti is 2<Nb/Ti. More preferably, it is $2 < Nb/Ti \leq 2.4$. In this regard, the molar ratio herein is a molar ratio at the time of preparation and is different from the composition ratio which is determined for the active material after the production. When a thermal reaction is caused in an autoclave container, the nucleation of $TiO_2$ anatase is faster than the formation of the precursor of $TiNb_2O_7$. Therefore, when the molar ratio at the time of preparing the raw material is $Nb/T \leq 2$, the nucleation of $TiO_2$ anatase is caused at the time of the hydrothermal synthesis. Thus, a single phase of $TiNb_2O_7$ is not formed in the active material after production. Accordingly, there is a problem such that battery characteristics are reduced. The present inventors have repeatedly conducted intensive studies. As a result, they have found that when the molar ratio (Nb/Ti) of Nb to Ti at the time of preparing the raw material is set to the above range, it is possible to suppress deposition of $TiO_2$. When the ratio (Nb/Ti) is set to 2 and element M1 and M2 each of which is at least one selected from V, Ta, Fe, Bi, Sb, As, P, Ce, Mo, W, B, Na, Mg, Al and Si Fe is added so as to realize $2 < Nb/\{Ti+(M1+M2)\} \leq 2.4$, the same effect can be expected.

The pH of the starting materials may be adjusted. An acid solution such as sulfuric acid or an alkaline solution such as aqueous ammonium can be used to adjust the pH.

Subsequently, the resulting mixed solution is heated in a closed container such as the autoclave container. The temperature when heating is preferably from 150 to 250° C. The heating time is preferably from 1 hour to 100 hours. When the synthesis is performed at a high temperature or for a long time, $TiO_2$ may be precipitated. From the viewpoint of suppressing the precipitation, the heating temperature is more preferably from 150° C. to 200° C. and the heating time is preferably from 1 hour to 10 hours.

Subsequently, filtration and washing are performed. Water, an organic solvent such as ethanol, an alkaline solution such as ammonia, or an acid solution such as hydrochloric acid may be used for washing. The precursor powder thus obtained is characterized in that the precursor powder is prepared as an amorphous powder in which Nb and Ti are mixed uniformly at the atomic level. Thus, when the precursor powder including Nb and Ti mixed at the atomic level and synthesized as amorphous particles is used, it is possible to sinter the precursor powder at a low temperature in a shorter time to obtain the $TiNb_2O_7$ phase. And, in the following sintering process, the temperature and the time can be reduced. Further, it is possible to include a step of grinding a precursor by methods such as ball milling, vibration milling, and bead milling.

Note that, a precursor in the form of the amorphous particle may contain a trace of $TiO_2$ anatase phase in the case that the ratio Nb/Ti is close to 2, or in the case that the synthesis is performed in the condition in which the sintering temperature is close to 200° C. However, the $TiO_2$ anatase phase has a low crystallinity and a primary particle of the formed particles has a small particle diameter. Therefore, the $TiO_2$ anatase phase can react the Nb source sufficiently, and it is difficult for this phase to remain after sintering described later. Thus, according to the sintering under the condition as described later, a single phase of $TiNb_2O_7$ having a high crystallinity can be obtained.

Subsequently, the resulting precursor is sintered. The sintering step corresponds to the sintering of the precursor described above. Here, the sintering is preformed, for example, in a temperature range of 700° C. to 1400° C. The sintering time herein is set to, for example, a range of 1 hour to 24 hours. More preferably, the sintering temperature is from 700° C. to 1100° C. and the sintering time is from 1 hour to 5 hours.

3. Sol-Gel Method

The sol-gel method is a method including: subjecting a sol of alkoxide and the like to hydrolysis and condensation polymerization to be gelatinized; drying the resulting product; and performing a high-temperature heating treatment thereon to obtain a powder. An example of the method of producing active material particles including niobium and titanium using the sol-gel method will be described below.

First, starting solutions are mixed so that an Nb/Ti ratio is a predetermined molar ratio. As the starting solutions, solutions which contain hydroxides, sulfides, oxides, salts, alkoxides or organic compounds, each of which contains Ti or Nb, are used. Examples of the Ti source may include $TiOSO_4$, $TiO_2$, $(NH_4)_2TiO(C_2O_4) \cdot H_2O$, $TiO(OH)_2$, $C_{12}H_{28}O_4Ti$, and $TiCl_4$. Examples of the Nb source include $NbCl_5$, $Nb(OH)_5$, $C_2H_8N_2O_4 \cdot Nb$, and $Nb_2O_5$.

After sufficiently mixing the starting solutions in the solution state, the moisture content and pH are adjusted, if appropriate, to facilitate the hydrolysis. Thus, the mixed solution acquires a gel state.

The gel-like material was dried and sintered to obtain a target powder. The sintering corresponds to the sintering of the precursor described above. The sintering is preferably performed in a temperature ranging from 700 to 1400° C. The sintering time is preferably from 1 to 24 hours. Further, it is possible to include a step of grinding a precursor by methods such as ball milling, vibration milling, and bead milling before the sintering process.

4. Coprecipitation Method

An example of the method of producing active material particles including niobium and titanium using the coprecipitation method will be described below.

First, starting materials are mixed so that an Nb/Ti ratio is a predetermined molar ratio. The starting materials are not particularly limited. For example, solutions which contain hydroxides, sulfides, oxides, salts, alkoxides or organic compounds, each of which contains Ti or Nb, may be used.

Examples of the Ti source may include $TiOSO_4$ (titanyl sulfate), $TiO_2$ (titanium oxide), $(NH_4)_2TiO(C_2O_4) \cdot H_2O$ (oxalic acid titanium/ammonium salt), $TiO(OH)_2$ (metatitanic acid), $C_{12}H_{28}O_4Ti$ (titanium isopropoxide), and $TiCl_4$ (titanium chloride). Examples of the Nb source include $NbCl_5$ (niobium chloride), $Nb(OH)_5$ (niobium hydroxide), $C_2H_8N_2O_4 \cdot Nb$, and $Nb_2O_5$. Here, the mole ratio at the time of preparing the raw material of Nb/Ti is 2<Nb/Ti. More preferably, it is 2<Nb/Ti≤2.4. In this regard, the molar ratio herein is a molar ratio at the time of preparation and is different from the composition ratio which is determined for the active material after the production.

Subsequently, an alkaline solution as the pH-adjuster added to the resulting mixture. As result, a coprecipitate is precipitated. As the pH-adjuster, an alkaline solution is preferably used. More preferably, one having a pH of 8 or more, still preferably one having a pH of 12 or more is used. For example, as the pH-adjuster, aqueous solution of ammonium having a concentration of 35 wt % may be used. Other than aqueous solution of ammonium, sodium hydroxide, potassium hydroxide, and lime water and the like may be used. The reaction temperature is preferably in the range of 10 to 80° C., and may be appropriately selected depending on the degree of agglomeration of the resulting coprecipitation and the particle shape thereof.

Subsequently, filtration and washing are performed. Water, an organic solvent such as ethanol, an alkaline solution such as ammonia, or an acid solution such as hydrochloric acid may be used for washing. The precursor powder thus obtained is characterized in that the precursor powder is prepared as an amorphous powder in which Nb and Ti are mixed uniformly at the atomic level. Thus, when the precursor powder including Nb and Ti mixed at the atomic level and synthesized as amorphous particles is used, it is possible to sinter the precursor power at a low temperature in a shorter time to obtain the $TiNb_2O_7$ phase. And, in the following sintering process, the temperature and the time can be reduced.

In the resulting precursor, there is possible the aggregation of the particle due to the difference of the starting material, the composition of the solution and the condition of the synthesis. In this case, it is preferable to include a step of grinding a precursor by methods such as ball milling, vibration milling, and bead milling to collapse the aggregation.

Subsequently, the resulting precursor is sintered. The sintering step corresponds to the sintering of the precursor described above. Here, the sintering is preformed, for example, in a temperature ranging from 700° C. to 1400° C. The sintering time herein is set to, for example, a range of 1 hour to 24 hours. More preferably, the sintering temperature is from 700° C. to 1100° C. and the sintering time is from 1 hour to 5 hours.

According to the method of producing an active material according to the second embodiment, there can be provided an active substance capable of realizing a nonaqueous electrolyte battery excellent in rate characteristics and cycle characteristics because a composite including active material particles containing niobium and titanium and a carbon-containing compound is sintered at a temperature of 650° C. or more and less than 900° C. in an inert gas atmosphere.

Third Embodiment

According to a third embodiment, there is provided a nonaqueous electrolyte battery. The nonaqueous electrolyte battery includes a positive electrode, a negative electrode and a nonaqueous electrolyte. The negative electrode includes the active substance according to the first embodiment.

The nonaqueous electrolyte battery according to the third embodiment may further include a separator provided between the positive electrode and the negative electrode, and a container which houses the positive electrode, the negative electrode, the separator, and the nonaqueous electrolyte.

Hereinafter, the negative electrode, the positive electrode, the nonaqueous electrolyte, the separator, and the container will be described in detail.

1) Positive Electrode

The positive electrode includes a current collector and a positive electrode material layer (positive electrode active material-containing layer) which is formed on one side or both sides of the current collector. The positive electrode material layer includes the active material and the binder.

Examples of the active material used include oxides, sulfides, and polymers. Examples thereof include manganese dioxide ($MnO_2$), iron oxide, copper oxide, and nickel oxide each of which absorbs lithium, lithium manganese composite oxides (e.g., $Li_xMn_2O_4$ or $Li_{0.5x}MnO_2$ (wherein 0≤x≤1)), lithium nickel composite oxides (e.g., $Li_xNiO_2$ (wherein 0≤x≤1)), lithium cobalt composite oxides (e.g., $Li_xCoO_2$ (wherein 0≤x≤1)), lithium nickel cobalt composite oxides (e.g., $Li_xNi_{1-y}Co_yO_2$) (wherein 0≤x≤1 and 0≤y≤1)), lithium manganese cobalt composite oxides (e.g., $Li_xMn_yCo_{1-y}O_2$ (wherein 0≤x≤1 and 0≤y≤1)), spinel-type lithium manganese nickel composite oxides (e.g., $Li_xMn_{2-y}Ni_yO_4$ (wherein 0≤x≤1 and 0≤y≤2)), lithium phosphorus oxides having an olivine structure (e.g., $Li_xFePO_4$, $Li_xFe_{1-y}Mn_yPO_4$, $Li_xCoPO_4$ (wherein 0≤x≤1 and 0≤y≤1)), iron sulfate ($Fe_2(SO_4)_3$), vanadium oxides (e.g., $V_2O_5$), and lithium nickel cobalt manganese composite oxides. As the active material, these compounds may be used alone or in combination with plural compounds.

As the polymer, for example, conductive polymer materials such as polyaniline and polypyrrole, or disulfide-based polymer materials can be used. Sulfur (S) and a carbon fluoride can also be used as an active material.

Preferable examples of the active material include compounds for the high positive electrode potential, such as lithium manganese composite oxide ($Li_xMn_2O_4$), lithium nickel composite oxide ($Li_xNiO_2$), lithium cobalt composite oxide ($Li_xCoO_2$), lithium nickel cobalt composite oxide ($LiNi_{1-y}Co_yO_2$), spinel-type lithium manganese nickel composite oxide ($Li_xMn_{2-y}Ni_yO_4$), lithium manganese cobalt composite oxide ($Li_x Mn_yCo_{1-y}O_2$), lithium iron phosphate ($Li_xFePO_4$), and lithium nickel cobalt manganese composite oxide. Here, x and y may fall within the above described range.

Particularly, when a nonaqueous electrolyte containing ordinary temperature molten salt is used, it is preferable to use lithium iron phosphate $Li_xVPO_4F$ (wherein 0≤x≤1), a lithium manganese composite oxide, a lithium nickel composite oxide, and a lithium nickel cobalt composite oxide from the viewpoint of cycle life. This is because the reactivity of the positive electrode active material with ordinary temperature molten salt is decreased.

The specific surface area of the active material is preferably from 0.1 $m^2$/g to 10 $m^2$/g. In the case of the positive electrode active material having a specific surface area of 0.1 $m^2$/g or more, the absorption and release site of lithium ions can be sufficiently ensured. In the case of the positive electrode active material having a specific surface area of 10 $m^2$/g or less, the handling in the industrial production is made easy, and therefore, a good charge and discharge cycle performance can be ensured.

The binder binds the active material to the current collector. Examples of the binder include polytetrafluoroethylene (PTFE), polyvinylidene fluoride (PVdF), and fluorine-based rubber.

The conductive agent is added, if necessary, to improve the current collection performance and suppress the contact resistance with the active material and current collector. Examples of the conductive agent include carbonaceous substances such as acetylene black, carbon black, and graphite.

In the positive electrode material layer, blending rates of the active material and binder are preferably 80 wt % to 98 wt % and 2 wt % to 20 wt %, respectively.

When the amount of the binder is 2 wt % or more, sufficient electrode strength is obtained. Further, when the amount of the binder is 20 wt % or less, the amount of the insulating material of the electrode can be reduced, leading to reduced internal resistance.

When the conductive agent is added, blending rates of the active material, binder, and conductive agent are preferably in a range of 77 wt % to 95 wt %, a range of 2 wt % to 20 wt %, and a range of 3 wt % to 15 wt %, respectively. When the amount of the conductive agent is 3 wt % or more, the above effect can be exerted. Further, when the amount of the conductive agent is 15 wt % or less, the decomposition of the nonaqueous electrolyte on the plane of the positive electrode conductive agent during storage at high temperatures can be reduced.

The current collector is preferably an aluminum foil or an aluminum alloy foil containing an element or elements such as Mg, Ti, Zn, Ni, Cr, Mn, Fe, Cu or Si.

The thickness of the aluminum foil or aluminum alloy foil is preferably 5 μm or more but 20 μm or less, more preferably 15 μm or less. The purity of the aluminum foil is preferably 99 wt % or more. The content of transition metals such as iron, copper, nickel, and chromium contained in the aluminum foil or the aluminum alloy foil is preferably to be 1 wt % or less.

For example, the positive electrode may be produced as follows. At first, the active material, the binder, and the conductive agent which is added if necessary, are suspended in an appropriate solvent to prepare slurry. Next, the slurry is applied to the positive electrode current collector to form a coated film. And then, the film is dried to form a positive electrode material layer. Finally, the dried film is pressed so that the positive electrode is obtained. Alternatively, the positive electrode may also be produced by forming a pellet comprising the active material, the binder, and the conductive agent which is added if necessary to produce a positive electrode material layer, which is then arranged on the current collector.

2) Negative Electrode

The negative electrode includes a current collector and a negative electrode material layer (negative electrode active material containing layer) which is formed on one side or both sides of the current collector. The negative electrode material layer includes the active material, the conductive agent, and the binder.

The active material includes the active substance according to the first embodiment. The active substance has the monoclinic crystal structure. The compound may be modified with at least one ion selected from the group consisting of an alkali metal cation, an alkaline earth metal cation, a transition metal cation, a sulfide ion, a sulfate ion, and a chloride ion.

The niobium titanium composite oxide has preferably an aspect ratio of 1 or more and 50 or less, a length of 1 μm or more and 50 μm in the direction of the major axis, and a length of 0.1 μm or more and 200 μm in the direction of the minor axis. The aspect ratio may be obtained by, for example, the laser diffractometer described above.

As the active material, the active substance according to the first embodiment may be used alone or in combination with other active materials. Usable examples of other active materials include anatase type titanium dioxide $TiO_2$, rutile type titanium dioxide $TiO_2$, β-type titanium dioxide, $Li_2Ti_3O_7$ (i.e., ramsdellite-type lithium titanate), $Li_4Ti_5O_{12}$ (i.e., spinel-type lithium titanate), niobium oxide, and niobium-containing composite oxide. Since these oxidized compounds have a specific gravity close to that of the compound contained in the active substance according to the first embodiment and are easily mixed and dispersed, they are appropriately used.

The conductive agent improves the current collection performance of the active material and suppresses the contact resistance with the current collector. Examples of the conductive agent include carbonaceous substances such as acetylene black, carbon black, and graphite.

The binder is added to fill gaps among the dispersed negative electrode active material particles and binds the active material to the conductive agent. Examples of the binder include polytetrafluoroethylene (PTFE), polyvinylidene fluoride (PVdF), fluorine-based rubber, and styrene butadiene rubber.

Preferably, blending rates of the active material, the conductive agent, and the binder in the negative electrode material layer are in a range of 68 wt % to 96 wt %, a range of 2 wt % to 30 wt %, and a range of 2 wt % to 30 wt %, respectively. If the amount of the conductive agent is 2 wt % or more, the current collection performance of the negative electrode material layer becomes good. If the amount of the binder is 2 wt % or more, the binding property of the negative electrode material layer and the current collector is sufficient, and excellent cycle characteristics can be expected. On the other hand, the amount of the binder is preferably 30 wt % or less in view of the improvement in the capacity of the nonaqueous electrolyte battery.

A material which is electrochemically stable at the lithium absorption-release potential of the negative electrode active material is used for the current collector. The current collector is preferably formed of copper, nickel, stainless steel or aluminium, or an aluminium alloy containing an element or elements such as Mg, Ti, Zn, Mn, Fe, Cu or Si. The thickness of the current collector is preferably from 5 μm to 20 μm. The current collector having such a thickness can achieve a strong, lightweight negative electrode.

For example, the negative electrode may be produced as follows. At first, the active material, the conductive agent, and the binder are suspended in a widely used solvent to prepare slurry. Next, the slurry is applied to the current collector to form a coated film. And then, the film is dried to form a negative electrode material layer. Finally, the dried film is pressed so that the negative electrode is obtained. Alternatively, the negative electrode may also be produced by forming a pellet comprising the active material, the conductive agent, and the binder to produce a negative electrode material layer and placing the layer on the current collector.

3) Nonaqueous Electrolyte

The nonaqueous electrolyte may be, for example, a liquid nonaqueous electrolyte prepared by dissolving an electrolyte in an organic solvent, or a gel-like nonaqueous electrolyte prepared by forming a composite of a liquid electrolyte and a polymer material.

The liquid nonaqueous electrolyte is preferably prepared by dissolving an electrolyte in an organic solvent at a concentration of 0.5 mol/L to 2.5 mol/L.

Examples of the electrolyte include a lithium salt such as lithium perchlorate ($LiClO_4$), lithium hexafluorophosphate ($LiPF_6$), lithium tetrafluoroborate ($LiBF_4$), arsenic lithium hexafluoride ($LiAsF_6$), lithium trifluoromethasulfonate ($LiCF_3SO_3$), and lithium bis(trifluoromethylsulfonyl)imide [$LiN(CF_3SO_2)_2$], and the mixtures thereof. The electrolyte is preferably one which is not easily oxidized even at a high potential and $LiPF_6$ is the most preferable.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); and γ-butyrolactone (GBL), acetonitrile (AN), and sulfolane (SL). These organic solvents can be used alone or in the form of a mixed solvent.

Examples of the polymer material include polyvinylidene fluoride (PVdF), polyacrylonitrile (PAN), and polyethylene oxide (PEO).

Alternatively, an ordinary temperature molten salt containing lithium ions (ionic melt), polymer solid electrolyte, inorganic solid electrolyte and the like may be used as the nonaqueous electrolyte.

The ordinary temperature molten salt (ionic melt) means compounds which can exist in a liquid state at normal temperature (15° C. to 25° C.) among organic salts constituted of combinations of organic cations and anions. Examples of the ordinary temperature molten salt include those which solely exist in a liquid state, those which are put into a liquid state when mixed with an electrolyte, and those which are put into a liquid state when dissolved in an organic solvent. The melting point of the ordinary temperature molten salt to be usually used for the nonaqueous electrolyte battery is generally 25° C. or less. Further, the organic cation has generally a quaternary ammonium skeleton.

The polymer solid electrolyte is prepared by dissolving an electrolyte in a polymer material and by solidifying the mixture.

The inorganic solid electrolyte is a solid material having lithium ion-conductivity.

4) Separator

The separator may be formed of a porous film containing a material such as polyethylene, polypropylene, cellulose or polyvinylidene fluoride (PVdF), or a synthetic resin-based nonwoven fabric. Particularly, a porous film formed of polyethylene or polypropylene melts at a constant temperature and can block electric current, and thus it is preferred from the viewpoint of improvement in safety.

5) Container

As the container, a container formed of a laminate film having a thickness of 0.5 mm or less or a container formed of metal having a thickness of 1 mm or less can be used. The thickness of the laminate film is more preferably 0.2 mm or less. The thickness of the metal container is preferably 0.5 mm or less, more preferably 0.2 mm or less.

Examples of the shape of the container include a flat type (thin type), rectangular type, cylindrical type, coin type, and button type. The container may be, for example, a container for a small battery which is loaded into a portable electronic device or a container for a large battery which is loaded into a two- or four-wheeled vehicle depending on the size of the battery.

As the laminate film, a multilayer film in which a metal layer is sandwiched between resin layers is used. The metal layer is preferably aluminum foil or aluminum alloy foil in order to reduce the weight. Polymer materials such as polypropylene (PP), polyethylene (PE), nylon, and polyethylene terephthalate (PET) can be used for the resin layer. The laminate film can be formed into a shape of the container by heat sealing.

The metal container is formed from aluminium or an aluminium alloy. It is preferable that the aluminium alloy includes an element or elements such as magnesium, zinc, and silicon. When transition metals such as iron, copper, nickel, and chromium are contained in the alloy, the content is preferably 1 wt % or less. Thus, the long-term reliability in the hot environment and heat-releasing property can be dramatically improved.

Subsequently, an example of the nonaqueous electrolyte battery according to the third embodiment will be more specifically described with reference to the drawings.

Figure 3:
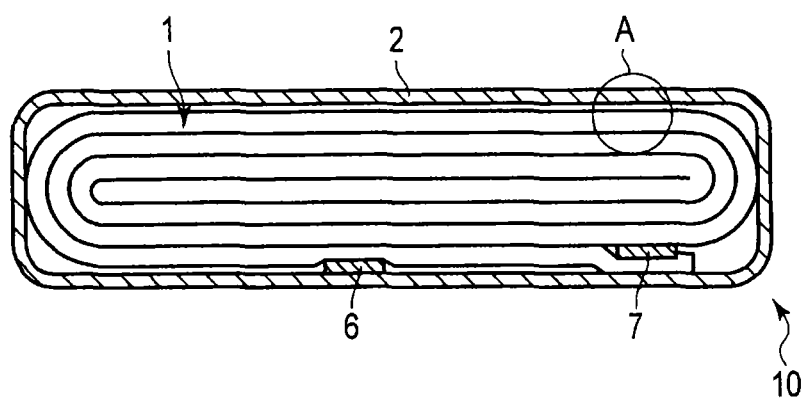
FIG. 3 is a cross-sectional view of a flat-shaped nonaqueous electrolyte battery according to a third embodiment.
Figure 4:
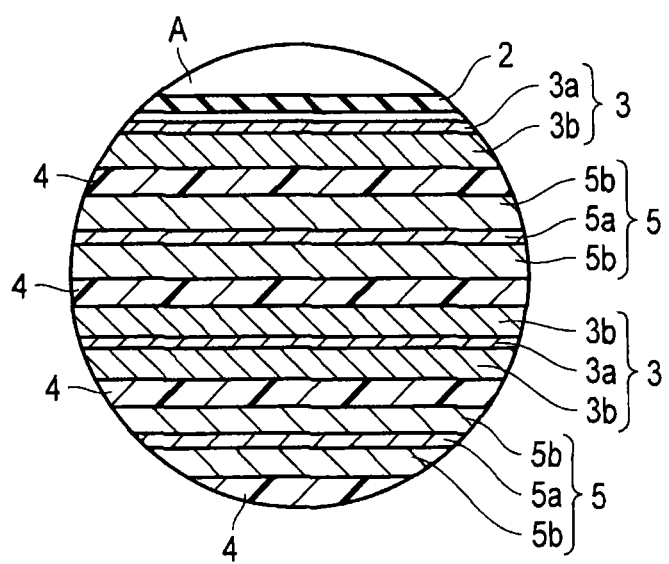
FIG. 4 is an enlarged sectional view of a portion A of FIG. 3.

FIG. 3 is a cross-sectional view of a flat-shaped nonaqueous electrolyte battery according to a third embodiment. FIG. 4 is an enlarged sectional view of an A portion of FIG. 3. Each drawing is a schematic one to facilitate the description of the present embodiment and its understanding. The shape, size, and ratio thereof are different from those of an actual device. However, they can be appropriately designed and modified by taking into consideration the following description and known techniques.

A nonaqueous electrolyte battery 10 shown in FIGS. 3 and 4 includes a flat-shaped wound electrode group 1. As shown in FIG. 3, the flat-shaped wound electrode group 1 is housed in a bag-shaped container 2 formed of a laminate film in which a metal layer is sandwiched between two resin layers. The flat-shaped wound electrode group 1 is formed by spirally winding a laminate obtained by stacking a negative electrode 3, a separator 4, a positive electrode 5, and another separator 4 in this order from the outside and subjecting it to press-molding.

As shown in FIG. 4, the negative electrode 3 includes a negative electrode current collector 3a and a negative electrode material layer 3b. The active substance for a battery according to the first embodiment is contained in the negative electrode material layer 3b. As shown in FIG. 4, the negative electrode 3 on the outermost layer has a configuration in which the negative electrode material layer 3b is formed on only one surface, facing inwardly, of the negative electrode current collector 3a. In other negative electrodes 3, the negative electrode material layer 3b is formed on both surfaces of the negative electrode current collector 3a.

As shown in FIG. 4, in the positive electrode 5, the positive electrode material layer 5b is formed on both surfaces of the positive electrode current collector 5a. The positive electrode material layer 5b is opposed to the negative electrode material layer 3b via the separator 4.

As shown in FIG. 3, in a vicinity of a peripheral edge of the wound electrode group 1, a negative electrode terminal 6 is connected to the negative electrode current collector 3a of the negative electrode 3 of an outermost shell layer, and a positive electrode terminal 7 is connected to the positive electrode current collector 5a of the positive electrode 5 present in the inner portion of the shell layer. The negative electrode terminal 6 and the positive electrode terminal 7 are extended outwardly from an opening of the bag-shaped container 2. For example, the liquid nonaqueous electrolyte is injected from the opening of the bag-shaped container 2. The wound electrode group 1 and the liquid nonaqueous electrolyte can be completely sealed by heat-sealing the opening of the bag-shaped container 2 across the negative electrode terminal 6 and the positive electrode terminal 7.

The negative electrode terminal 6 is formed from a material which is electrically stable in Li absorption and release potential of the negative electrode active material and has conductivity. Specifically, it is formed of copper, nickel, stainless steel or aluminum, or an aluminum alloy containing an element or elements such as Mg, Ti, Zn, Mn, Fe, Cu, and Si. It is preferable that the negative electrode terminal 6 is formed of a material similar to that of the negative electrode current collector 3a in order to reduce the contact resistance with the negative electrode current collector.

The positive electrode terminal 7 is formed of, for example, a material which is electrically stable in a potential range of 3 V to 5 V (vs. $Li/Li^+$), and preferably 3.0 V to 4.25 V (vs. $Li/Li^+$) and has conductivity. Specifically, it is formed of aluminium or an aluminium alloy containing elements such as Mg, Ti, Zn, Ni, Cr, Mn, Fe, Cu, and Si. It is preferable that the positive electrode terminal is formed of the same material as that of the positive electrode current collector 5a in order to reduce the contact resistance with the positive electrode current collector 5a.

The configuration of the nonaqueous electrolyte battery according to the third embodiment is not limited to the configurations shown in FIGS. 3 and 4. The nonaqueous electrolyte battery according to the third embodiment may also have, for example, configurations shown in FIGS. 5 and 6.

Figure 5:
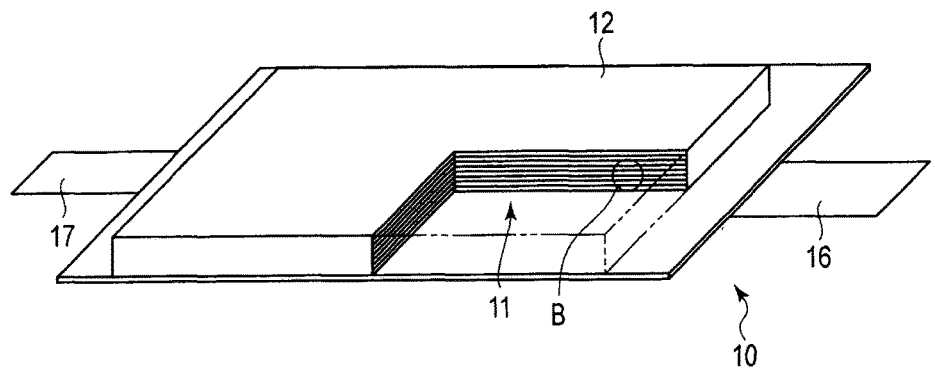
FIG. 5 is a partially cut perspective view schematically showing another flat-shaped nonaqueous electrolyte battery according to the third embodiment.
Figure 6:
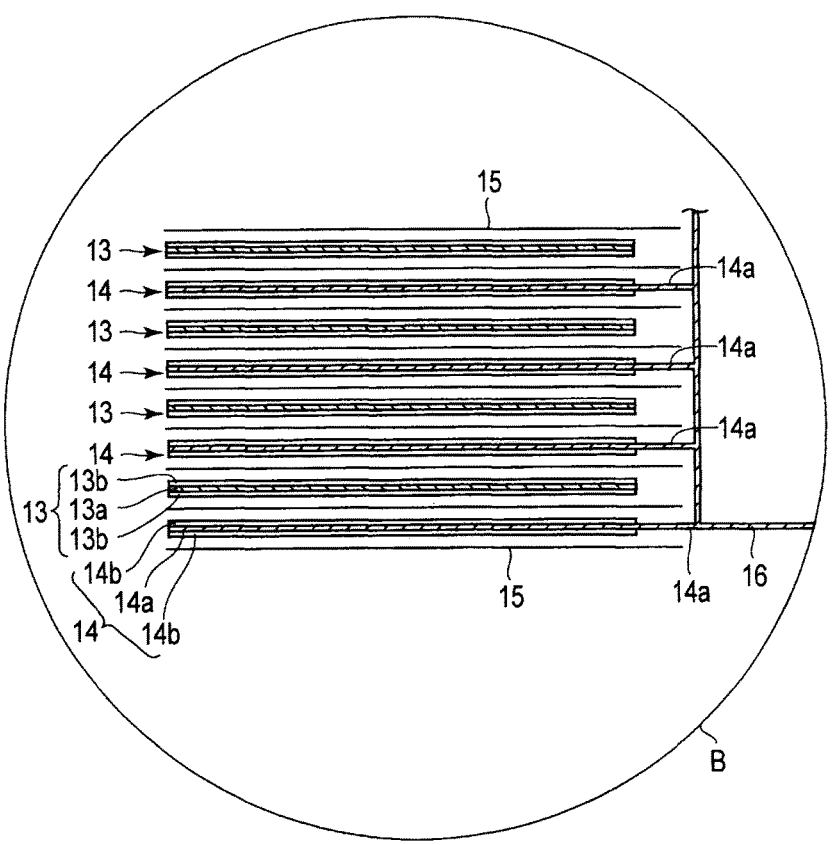
FIG. 6 is an enlarged sectional view of a portion B of FIG. 5.

FIG. 5 is a partially cut perspective view schematically showing another flat-shaped nonaqueous electrolyte battery according to the third embodiment. FIG. 6 is an enlarged sectional view of a B portion of FIG. 5.

The nonaqueous electrolyte battery 10 shown in FIGS. 5 and 6 comprises a lamination-type electrode group 11. As shown in FIG. 5, the lamination-type electrode group 11 is housed in an exterior member 12 which is formed of a laminate film in which a metal layer is sandwiched between two resin films. As shown in FIG. 6, the lamination-type electrode group 11 has a structure in which a positive electrode 13 and a negative electrode 14 are alternately stacked while a separator 15 is sandwiched between the both electrodes. Plural positive electrodes 13 are present. Each of the positive electrodes 13 includes the current collector 13a and a positive electrode active material containing layer 13b formed on both surfaces of the current collector 13a. Plural negative electrodes 14 are present. Each of the negative electrodes 14 includes a negative electrode current collector 14a and a negative electrode active material containing layer 14b formed on both surfaces of the negative electrode current collector 14a. In each of the negative electrode current collectors 14a of the negative electrodes 14, a side is protruded from the negative electrode 14. The protruded negative electrode current collector 14a is electrically connected to a belt-like negative electrode terminal 16. The distal end of the negative electrode terminal 16 is externally drawn from the exterior member 12. In the positive electrode current collector 13a of the positive electrode 13, not illustrated, one side located at the opposite side against the protruded side of the negative electrode current collector 14a is protruded from the positive electrode 13. The positive electrode current collector 13a protruded from the positive electrode 13 is electrically connected to a belt-like positive electrode terminal 17. The distal end of the belt-like positive electrode terminal 17 is located at the opposite side of the negative electrode terminal 16 and externally drawn from the exterior member 12.

The nonaqueous electrolyte battery according to the third embodiment includes the negative electrode which includes the active substance for a battery according to the first embodiment. Therefore, the nonaqueous electrolyte battery according to the third embodiment can exhibit excellent rate characteristics and excellent cycle characteristics.

Fourth Embodiment

According to a fourth embodiment, there is provided a battery pack. The battery pack includes a nonaqueous electrolyte battery according to the third embodiment.

The battery pack according to the fourth embodiment includes at least one electrolyte battery (unit cell) according to the third embodiment. When the plural unit cells are included, each of the unit cells is electrically connected with one other in series or in parallel.

Subsequently, the battery pack according to the fourth embodiment will be described with reference to the drawings.

Figure 7:
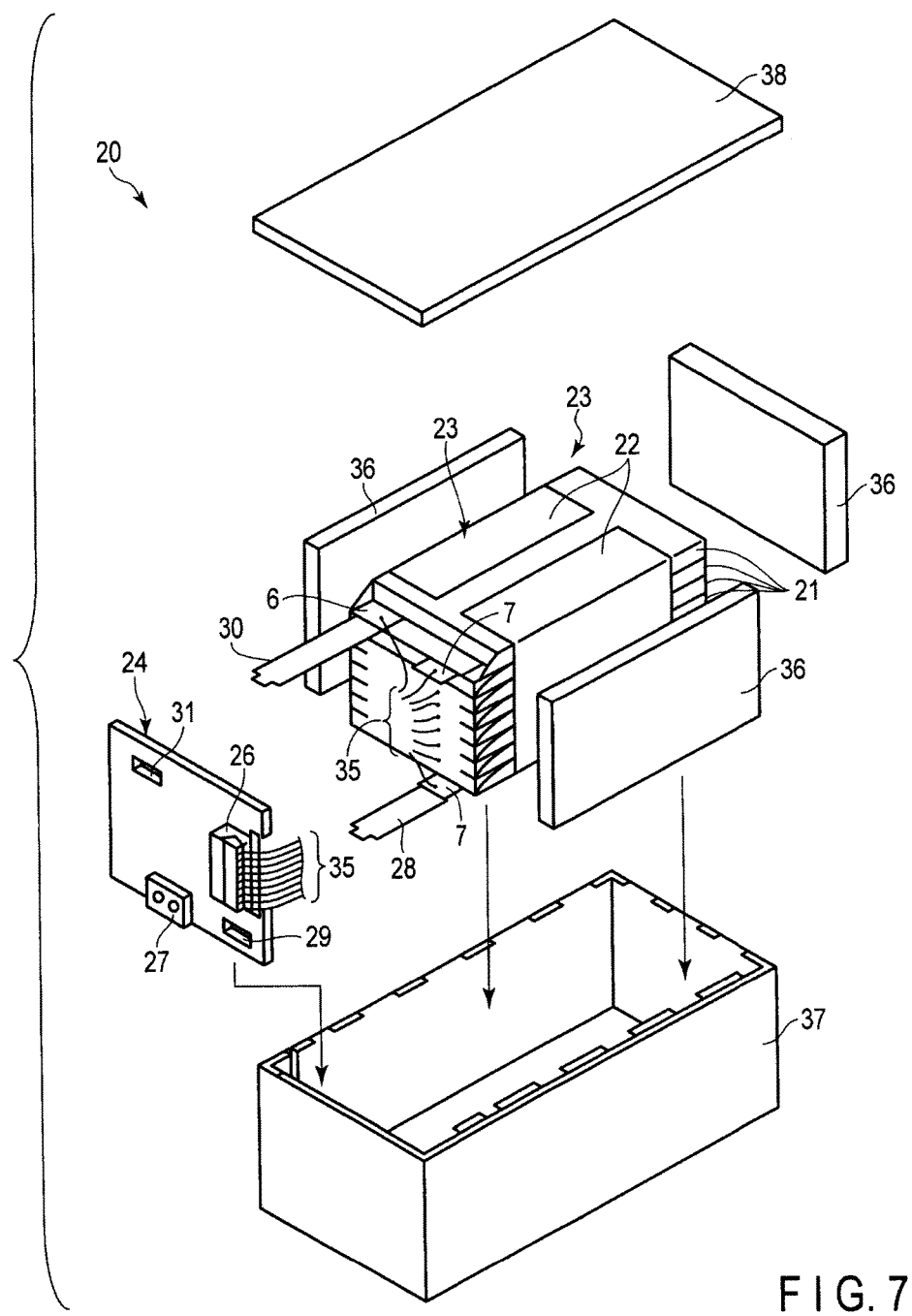
FIG. 7 is an exploded perspective view of a battery pack according to a fourth embodiment.
Figure 8:
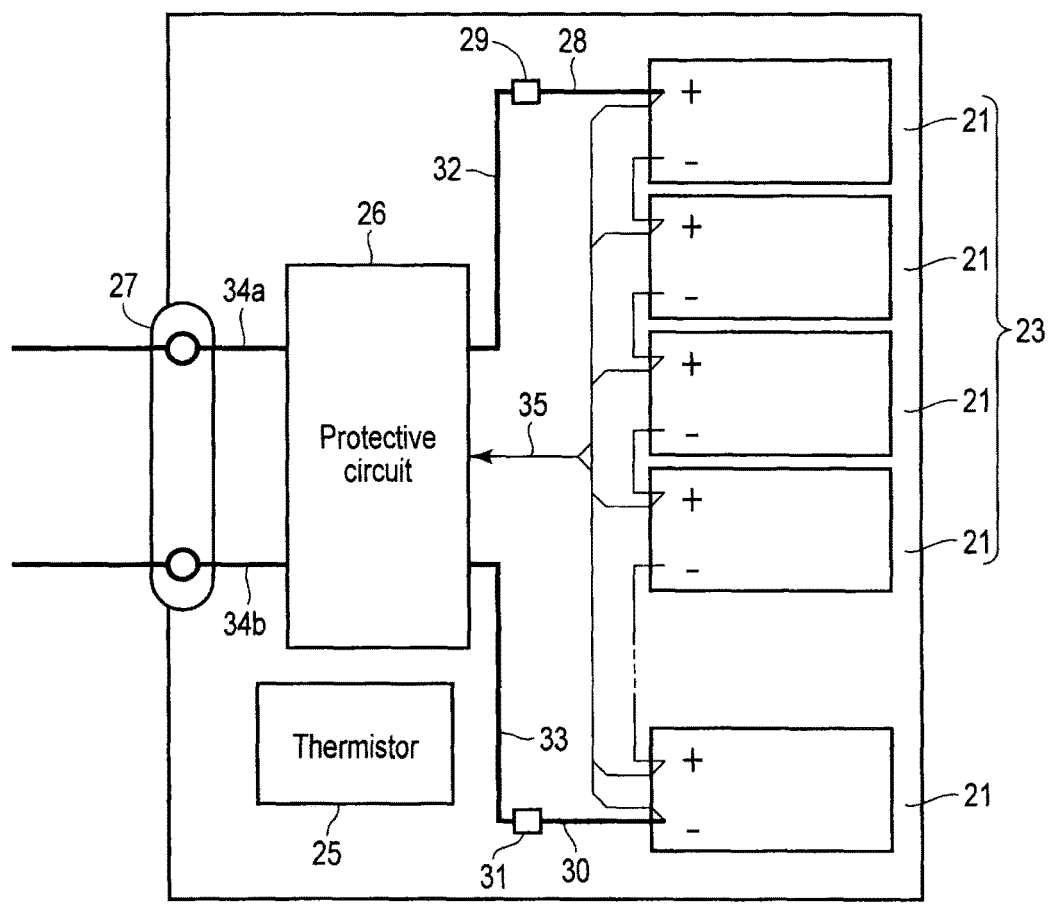
FIG. 8 is a block diagram showing the electric circuit of the battery pack of FIG. 7.

FIG. 7 is an exploded perspective view of a battery pack according to a forth embodiment. FIG. 8 is a block diagram showing the electric circuit of the battery pack of FIG. 7.

A battery pack 20 shown in FIGS. 7 and 8 comprises plural unit cells 21. Each of the unit cells 21 is the nonaqueous electrolyte battery 10 shown in FIGS. 3 and 4.

As shown in FIG. 7, a battery module 23 is configured by stacking the unit cells 21 so that a negative electrode terminal 6 extended outside and a positive electrode terminal 7 are arranged in the same direction and fastening them with an adhesive tape 22. The unit cells 21 are electrically connected in series with one another as shown in FIG. 8. The unit cells 21 electrically connected in series form the battery module 23.

As shown in FIG. 7, a printed wiring board 24 is arranged opposed to the side plane of the unit cells 21 where the negative electrode terminal 6 and the positive electrode terminal 7 are extended. A thermistor 25, a protective circuit 26, and an energizing terminal 27 to an external instrument are mounted on the printed wiring board 24 as shown in FIG. 8. An electric insulating plate (not shown) is attached to the plane of the protective circuit board 24 facing the battery module 23 to avoid unnecessary connection of the wiring of the battery module 23.

As shown in FIG. 8, a positive electrode-side lead 28 is connected to the positive electrode terminal 7 located at the bottom layer of the battery module 23 and the distal end is inserted into a positive electrode-side connector 29 of the printed wiring board 24 so as to be electrically connected. A negative electrode-side lead 30 is connected to the negative electrode terminal 6 located at the top layer of the battery module 23 and the distal end is inserted into a negative electrode-side connector 31 of the printed wiring board 24 so as to be electrically connected. The connectors 29 and 31 are connected to the protective circuit 26 through wirings 32 and 33 formed in the printed wiring board 24.

The thermistor 25 is used to detect the temperature of the unit cells 21. The detection signal is sent to the protective circuit 26. The protective circuit 26 can shut down a plus-side wiring 34a and a minus-side wiring 34b between the protective circuit 26 and the energizing terminal 27 to an external instrument under a predetermined condition. The predetermined condition as an example is the case when the detection temperature of the thermistor 25 becomes more than a predetermined temperature. Further, the predetermined condition as another example is the case when the over-charge, over-discharge, and over-current of the unit cells 21 are detected. The detection of the over-charge may be performed on each of the unit cells 21 or the whole of the battery module 23. When the over-charge of each of the unit cells 21 is detected, the voltage of each of the cell units may be detected or the potential of the positive electrode or the negative electrode may be detected. In the case of the latter, a lithium electrode to be used as a reference electrode is inserted into each of the unit cells 21. In the case of the battery pack shown in FIGS. 7 and 8, wiring 35 for voltage detection is connected to each of the unit cells 21 and detection signals are sent to the protective circuit 26 through the wirings 35.

As shown in FIG. 7, protective sheets 36 comprised of rubber or resin are arranged on three side surfaces of the battery module 23 except the side surface from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction of the housing container 37 and on one of the internal surface at the opposite side in a short side direction. The printed wiring board 24 is arranged on the other internal surface in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, winding a heat-shrinkable tape around such, and thermally shrinking the heat-shrinkable tape.

In FIGS. 7 and 8, the form in which the unit cells 21 are connected in series is shown. However, in order to increase the capacity, the cells may be connected in parallel. Alternatively, the cells may be formed by combining series connection and parallel connection. A plurality of the assembled battery packs can be connected in series or in parallel.

The form of the battery pack according to the fourth embodiment is appropriately changed according to the use. The battery pack according to the fourth embodiment is used suitably for the application which requires the excellent cycle characteristics when a high current is taken out. It is used specifically as a power source for digital cameras, for vehicles such as two- or four-wheel hybrid electric vehicles, for two- or four-wheel electric vehicles, and for assisted bicycles. Particularly, it is suitably used as a battery for automobile use.

The battery pack according to the fourth embodiment includes the nonaqueous electrolyte battery according to the third embodiment. Therefore, the battery pack according to the third embodiment can exhibit excellent rate characteristics and excellent cycle characteristics.

EXAMPLES

Hereinafter, Examples will be described. However, the present invention is not limited to the following Examples, without departing from the spirit of the present invention.

Example 1

In Example 1, an active substance was produced by the following procedure.

<Preparation of Active Material Particles>

First, titanium dioxide ($TiO_2$) and niobium pentoxide ($Nb_2O_5$) were weighed so as to have a mole ratio of 1:1. These materials were placed in a mortar and ethanol was added thereto and mixed. Then, the mixture was placed into an alumina crucible, followed by heat treatment in atmospheric air at 1000° C. for 12 hours using an electric furnace. After natural cooling, the resulting mixture was ground and mixed again in the mortar. Then, the mixture was subjected to heat treatment at 1100° C. for 12 hours to obtain active material particles.

As the result of ICP analysis, it was found that the composition of the active material particles was $TiNb_2O_7$.

<Production of Composite>

The active material particles obtained in the above manner were added to a solution containing 10% by weight of sucrose based on the weight of active material, followed by mixing with a ball mill. After mixing, the resulting product was dried with a heater at 80° C. to evaporate water completely. In this way, there was obtained a composite including active material particles and a phase which contained a carbon-containing compound covering at least a part of the surface of the active material particles.

<Sintering of Composite>

The resulting composite was subjected to reduction sintering at 650° C. for 1 hour under a nitrogen atmosphere. An active substance of Example 1 was obtained by the sintering.

<Raman Spectrometry>

A part of the active substance was used as a sample and the sample was subjected to Raman spectrometry using a 532-nm measuring light source according to the method described above. The resulting Raman spectrum is shown in FIG. 9.

As shown in FIG. 9, a Raman spectrum chart for the active substance obtained in Example 1 had a D band having a peak top at 1350 $cm^{-1}$ and a G band having a peak top at 1586 $cm^{-1}$. Further, the Lorentzian function fitting method was performed, and a ratio $I_G/I_D$ between a peak intensity $I_G$ of the G band and a peak intensity $I_D$ of the D band which originated from the carbon material was 1.18.

<Wide-Angle X-Ray Scattering Measurement>

A part of the active substance was used as a sample and the sample was subjected to wide-angle X-ray scattering measurement according to the method described above. The resulting spectrum is shown in FIG. 10. In the resulting spectrum, as shown in FIG. 10, the peak B appeared at the position of 2θ=24.0°.

The obtained spectrum was confirmed using the JCPDS card. Then, it was confirmed that the obtained active substance had the same crystal structure as that of the monoclinic oxide $TiNb_2O_7$: JCPDS card 70-2009.

On the other hand, as shown in FIG. 10, the resulting spectrum did not have a peak attributed to $NbO_2$ which would have appeared near the position of 2θ=26.57° if $NbO_2$ were present in the active substance.

Comparative Example 1

An active substance of Comparative example 1 was produced in the same manner as Example 1, except that the sintering temperature in a reduction atmosphere of a composite was set to 600° C.

As the result of ICP analysis, it was found that the composition of active material particles prepared by the solid-phase method was $TiNb_2O_7$.

The resulting active substance was subjected to Raman spectrometry in the same manner as Example 1. As a result, it was found that the obtained active substance contained a carbon material having a G band near 1580 $cm^{-1}$ and a D band near 1330 $cm^{-1}$ in a Raman spectrum chart. Further, the Lorentzian function fitting method was performed, and a ratio $I_G/I_D$ between a peak intensity $I_G$ of the G band and a peak intensity $I_D$ of the D band was 1.31.

Figure 11:
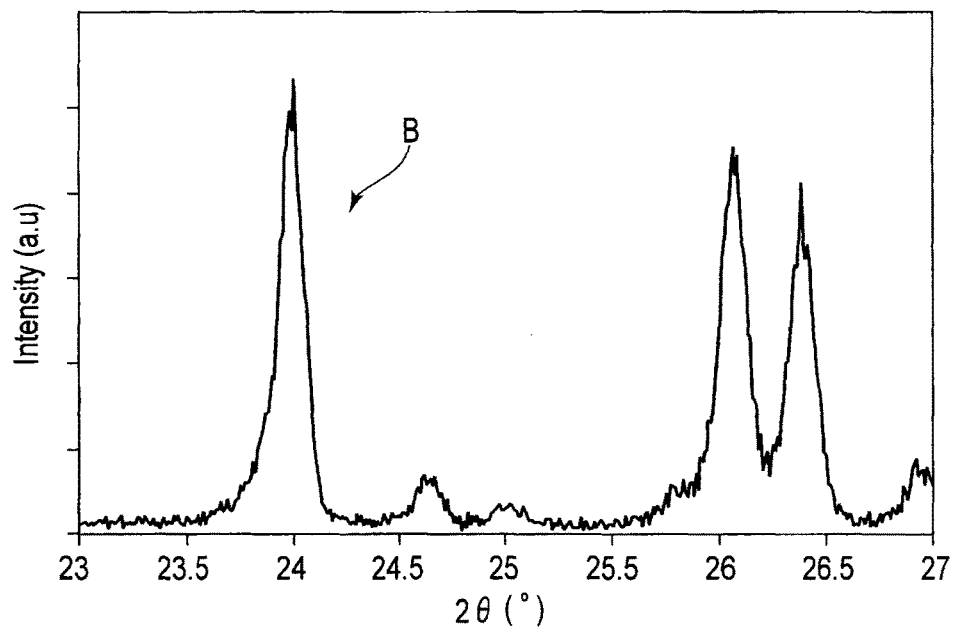
FIG. 11 is a wide-angle X-ray diffraction pattern for Comparative Example 1.

The resulting active substance was subjected to wide-angle X-ray scattering measurement in the same manner as Example 1. The resulting spectrum is shown in FIG. 11. In the resulting spectrum, as shown in FIG. 11, the peak B appeared at the position of 2θ=23.96°.

The obtained spectrum was confirmed using the JCPDS card. Then, it was confirmed that the obtained active substance had the same crystal structure as that of the monoclinic oxide $TiNb_2O_7$: JCPDS card 70-2009.

On the other hand, as shown in FIG. 11, the resulting spectrum did not have a peak attributed to $NbO_2$ which would have appeared near the position of 2θ=26.57° if $NbO_2$ were present in the active substance.

Example 2

An active substance of Example 2 was produced in the same manner as Example 1, except that the sintering temperature in a reduction atmosphere of a composite was set to 700° C.

As the result of ICP analysis, it was found that the composition of active material particles prepared by the solid-phase method was $TiNb_2O_7$.

Further, the resulting active substance was subjected to Raman spectrometry in the same manner as Example 1. The resulting Raman spectrum is shown in FIG. 12.

Figure 12:
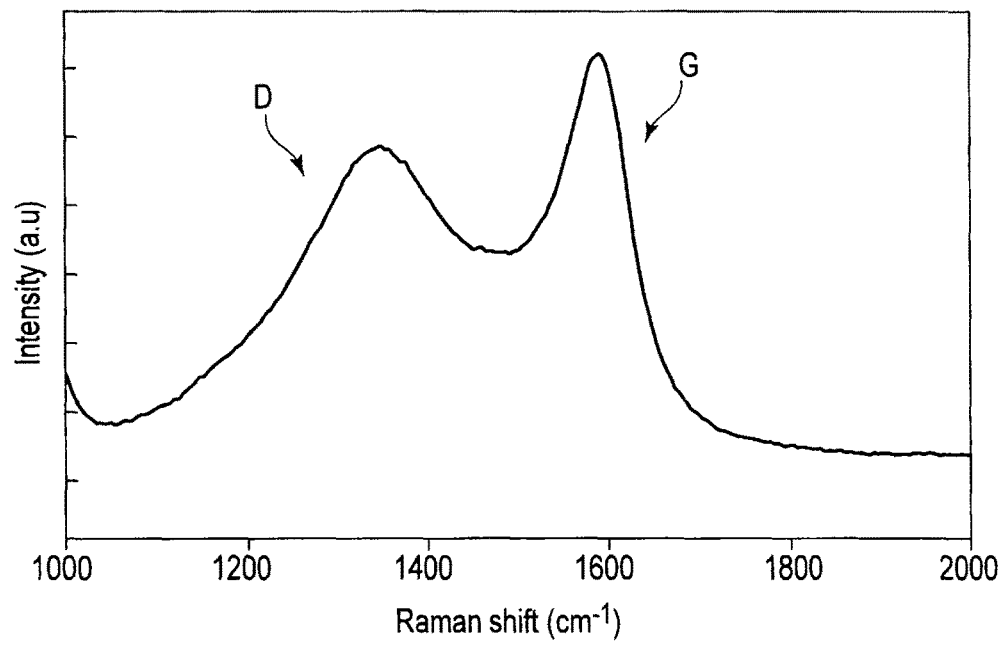
FIG. 12 is a Raman spectrum for Example 2.

As shown in FIG. 12, a Raman spectrum chart for the active substance obtained in Example 2 had a G band having a peak top at 1587 $cm^{-1}$ and a D band having a peak top at 1350 $cm^{-1}$. Further, the Lorentzian function fitting method was performed, and a ratio $I_G/I_D$ between a peak intensity $I_G$ of the G band and a peak intensity $I_D$ of the D band which originated from the carbon material was 1.12.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 2 had a peak B attributed to monoclinic oxide $TiNb_2O_7$, but did not have a peak attributed to $NbO_2$.

Example 3

An active substance of Example 3 was produced in the same manner as Example 1, except that the sintering temperature in a reduction atmosphere of a composite was set to 750° C.

As the result of ICP analysis, it was found that the composition of active material particles prepared by the solid-phase method was $TiNb_2O_7$.

The resulting active substance was subjected to Raman spectrometry in the same manner as Example 1. As a result, it was found that the obtained active substance contained a carbon material having a G band near 1580 cm$^{-1}$ and a D band near 1330 cm$^{-1}$ in a Raman spectrum chart. Further, the Lorentzian function fitting method was performed, and a ratio $I_G/I_D$ between a peak intensity $I_G$ of the G band and a peak intensity $I_D$ of the D band was 0.95.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 4 had a peak B attributed to monoclinic oxide $TiNb_2O_7$, but did not have a peak attributed to $NbO_2$.

Example 4

An active substance of Example 4 was produced in the same manner as Example 1, except that the sintering temperature in a reduction atmosphere of a composite was set to 800° C.

As the result of ICP analysis, it was found that the composition of active material particles prepared by the solid-phase method was $TiNb_2O_7$.

The resulting active substance was subjected to Raman spectrometry in the same manner as Example 1. As a result, it was found that the obtained active substance contained a carbon material having a G band near 1580 cm$^{-1}$ and a D band near 1330 cm$^{-1}$ in a Raman spectrum chart. Further, the Lorentzian function fitting method was performed, and a ratio $I_G/I_D$ between a peak intensity $I_G$ of the G band and a peak intensity $I_D$ of the D band was 0.95.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 4 had a peak B attributed to monoclinic oxide $TiNb_2O_7$, but did not have a peak attributed to $NbO_2$.

Comparative Example 2

An active substance of Comparative example 2 was produced in the same manner as Example 1, except that the sintering temperature in a reduction atmosphere of a composite was set to 900° C.

As the result of ICP analysis, it was found that the composition of active material particles prepared by the solid-phase method was $TiNb_2O_7$.

The resulting active substance was subjected to Raman spectrometry in the same manner as Example 1. As a result, it was found that the obtained active substance contained a carbon material having a G band near 1580 cm$^{-1}$ and a D band near 1330 cm$^{-1}$ in a Raman spectrum chart. Further, the Lorentzian function fitting method was performed, and a ratio $I_G/I_D$ between a peak intensity $I_G$ of the G band and a peak intensity $I_D$ of the D band was 1.21.

Figure 13:
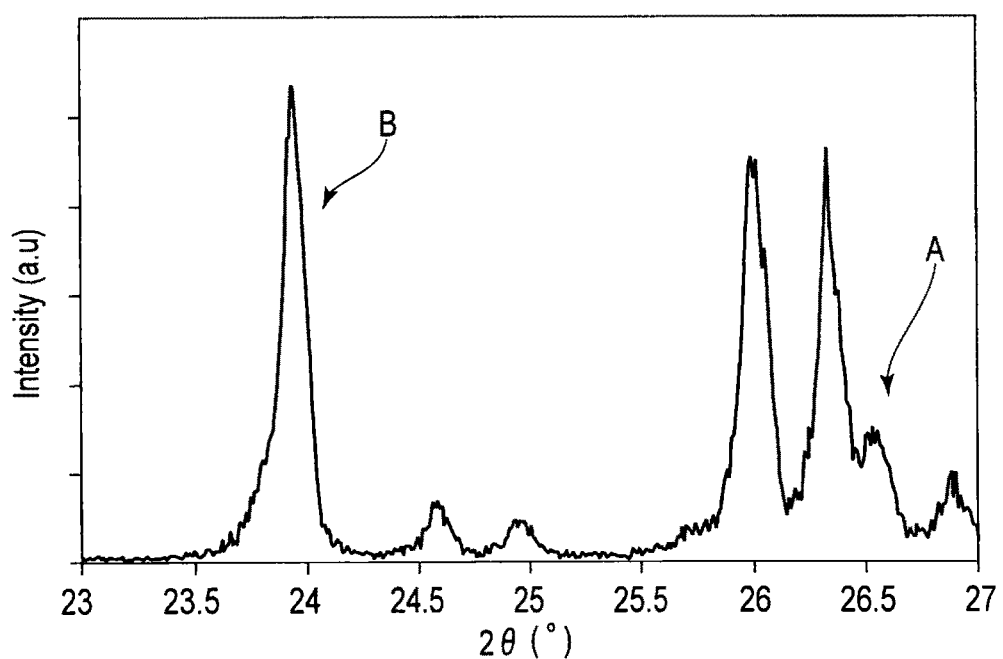
FIG. 13 is a wide-angle X-ray diffraction pattern for Comparative Example 2.

Further, the resulting active substance was subjected to wide-angle X-ray scattering measurement in the same manner as Example 1, and the spectrum shown in FIG. 13 was obtained. In the resulting spectrum as shown in FIG. 13, a peak B was observed at the position of 2θ=23.93° and a peak A was observed at the position of 2θ=26.51°.

The obtained spectrum was confirmed using the JCPDS card. Then, it was confirmed that the obtained active substance had the same crystal structure as that of the monoclinic oxide $TiNb_2O_7$: JCPDS card 70-2009. Further, a peak not attributed to $TiNb_2O_7$ was well matched with a peak described in PDF-2 card 9-235. Thus, it was confirmed that the active substance had the same crystal structure as that of niobium dioxide $NbO_2$.

An intensity ratio $I_A/I_B$ between an intensity $I_A$ of the peak A and an intensity $I_B$ of the peak B was 0.26.

Comparative Example 3

An active substance of Comparative example 3 was produced in the same manner as Example 1, except that the sintering temperature in a reduction atmosphere of a composite was set to 1000° C.

As the result of ICP analysis, it was found that the composition of active material particles prepared by the solid-phase method was $TiNb_2O_7$.

The resulting active substance was subjected to Raman spectrometry in the same manner as Example 1. As a result, it was found that the obtained active substance contained a carbon material having a G band near 1580 cm$^{-1}$ and a D band near 1330 cm$^{-1}$ in a Raman spectrum chart. Further, the Lorentzian function fitting method was performed, and a ratio $I_G/I_D$ between a peak intensity $I_G$ of the G band and a peak intensity $I_D$ of the D band was 1.62.

Further, the resulting active substance was subjected to wide-angle X-ray scattering measurement in the same manner as Example 1, and the same spectrum including $TiNb_2O_7$ and $NbO_2$ as Comparative example 2 was obtained. In other words, the wide-angle X-ray spectrum of the active substance obtained in Comparative example 3 had a peak B attributed to monoclinic oxide $TiNb_2O_7$ and a peak A attributed to $NbO_2$.

An intensity ratio $I_A/I_B$ between an intensity $I_A$ of the peak A and the intensity $I_B$ of the peak B was 1.01.

Comparative Example 4

An active substance of Comparative example 4 was produced in the same manner as Example 1, except that the sintering temperature in a reduction atmosphere of a composite was set to 550° C. and the sintering was performed over 6 hours.

As the result of ICP analysis, it was found that the composition of active material particles prepared by the solid-phase method was $TiNb_2O_7$.

The resulting active substance was subjected to Raman spectrometry in the same manner as Example 1. As a result, it was found that the obtained active substance contained a carbon material having a G band near 1580 cm$^{-1}$ and a D band near 1330 cm$^{-1}$ in a Raman spectrum chart. Further, the Lorentzian function fitting method was performed, and a ratio $I_G/I_D$ between a peak intensity $I_G$ of the G band and a peak intensity $I_D$ of the D band was 1.48.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 4 had a peak B attributed to monoclinic oxide $TiNb_2O_7$, but did not have a peak attributed to $NbO_2$.

Comparative Example 5

Some of the active material particles produced in Example 1 were collected and used as an active substance of Comparative example 5.

Regarding the active substances of Examples 1 to 4 and Comparative examples 1 to 5, the sintering temperature of composite, the Raman band intensity ratio $I_G/I_D$, and the XRD intensity ratio $I_A/I_B$ are shown in Table 1 below.

TABLE 1

| | Sintering Temperature of Composite (° C.) | Composition of Active Material | Raman band Intensity Ratio $I_G/I_D$ | XRD Intensity Ratio $I_A/I_B$ |
|---|---|---|---|---|
| Example 1 | 650 | TiNb$_2$O$_7$ | 1.18 | (No Peak A) |
| Comparative Example 1 | 600 | TiNb$_2$O$_7$ | 1.31 | (No Peak A) |
| Example 2 | 700 | TiNb$_2$O$_7$ | 1.12 | (No Peak A) |
| Example 3 | 750 | TiNb$_2$O$_7$ | 0.95 | (No Peak A) |
| Example 4 | 800 | TiNb$_2$O$_7$ | 0.95 | (No Peak A) |
| Comparative Example 2 | 900 | TiNb$_2$O$_7$ | 1.21 | 0.26 |
| Comparative Example 3 | 1000 | TiNb$_2$O$_7$ | 1.62 | 1.01 |
| Comparative Example 4 | 550 | TiNb$_2$O$_7$ | 1.48 | (No Peak A) |
| Comparative Example 5 | (Composite is not produced) | TiNb$_2$O$_7$ | (Not Measured) | (Not Measured) |

<Production of Evaluation Cell>

The active substances of Examples 1 to 4 and Comparative examples 1 to 5 were used and evaluation cells of Examples 1 to 4 and Comparative examples 1-5 were produced by the following procedure.

First, 100% by mass of each of the active substances, 4% by mass of acetylene black and 3% by weight of graphite as conductive agents, and 4% by mass of polyvinylidene fluoride (PVdF) as a binder were added to N-methyl pyrrolidone (NMP), and mixed to prepare a slurry. This slurry was applied to one side of a current collector formed of 12-μm-thick aluminum foil and dried. After drying, the current collector was pressed to obtain an electrode having an electrode-weight per unit area of 25 g/m$^2$.

On the other hand, ethylene carbonate (EC) and diethyl carbonate (DEC) were mixed at a volume ratio of 1:2 to prepare a nonaqueous solvent. An LiPF$_6$ supporting salt was dissolved in the resulting mixed solvent at a concentration of 1 mol/L. In this way, the nonaqueous electrolyte was prepared.

A three-electrode-type beaker cell was produced by using the obtained electrode as a working electrode, Li metal as counter and reference electrodes, and the nonaqueous electrolyte prepared previously.

<Evaluation of Charge and Discharge Characteristics>

The first cycle charge and discharge (at a charge current of 0.2 C and a discharge current of 0.2 C) was performed on the evaluation cells of Examples 1 to 4 and Comparative examples 1 to 5. Subsequently, 1 charge and discharge cycle (at a charge current of 1 C and a discharge current of 0.2 C) was performed, 1 charge and discharge cycle (at a charging current of 1 C and a discharging current of 20 C) was performed, and then the ratio (%) of the discharge capacity at 20 C to the discharge capacity at 0.2 C was calculated.

Then, 50 charge and discharge cycles (at a charge current of 1 C and a discharge current of 1 C) were performed and the average charge and discharge efficiency (%) was calculated from the charge and discharge efficiency of each cycle. Regarding all the cycles, the evaluation temperature was 25° C. and the cutoff potential was from 3.0 to 1.0 V. Further, the charge was performed in a constant current-constant voltage mode, while the discharge was performed in a constant current mode.

Regarding the evaluation cells of Examples 1 to 4 and Comparative examples 1 to 5, the first cycle discharge capacity (mAh/g), the ratio (%) of the discharge capacity at 20 C to the discharge capacity at 0.2 C, the discharge capacity retention ratio (%) after 50 cycles at 1 C, and the average charge and discharge efficiency (%) up to 50 cycles are described in Table 2 below.

TABLE 2

| | First Cycle Discharge Capacity (mAh/g) | Ratio (%) of Discharge Capacity at 20 C to Discharge Capacity at 0.2 C | Discharge Capacity Retention Ratio (%) after 50 Cycles at 1 C | Average Charge and Discharge Efficiency (%) |
|---|---|---|---|---|
| Example 1 | 274.0 | 80.2 | 89.6 | 98.8 |
| Comparative Example 1 | 273.1 | 66.3 | 81.3 | 98.5 |
| Example 2 | 277.5 | 84.6 | 90.3 | 99.1 |
| Example 3 | 276.5 | 84.1 | 91.2 | 99 |
| Example 4 | 276.2 | 86.2 | 89.3 | 99.3 |
| Comparative Example 2 | 250.2 | 67.6 | 69.6 | 97.1 |
| Comparative Example 3 | 192.9 | 81.2 | 74 | 98.9 |
| Comparative Example 4 | 273.5 | 62.4 | 68.8 | 97.6 |
| Comparative Example 5 | 267.9 | 44.5 | 42.83 | 95.1 |

The results shown in Table 2 indicate that the evaluation cells of Examples 1 to 4 were superior in all of the first cycle discharge capacity (mAh/g), the ratio of the discharge capacity at 20 C to the discharge capacity at 0.2 C, the discharge capacity retention ratio after 50 cycles at 1 C, and the average charge and discharge efficiency up to 50 cycles to that of Comparative example 5 in which a composite was not formed.

On the other hand, the results shown in Table 2 indicate that the evaluation cell of Comparative example 1 in which the Raman band intensity ratio $I_G/I_D$ was 1.31 was significantly inferior in the ratio of the discharge capacity at 20 C to the discharge capacity at 0.2 C to the evaluation cells of Examples 1 to 4. Further, the results indicate that the evaluation cell of Comparative example 4 in which the Raman band intensity ratio $I_G/I_D$ was 1.48 was significantly inferior in the ratio of the discharge capacity at 20 C to the discharge capacity at 0.2 C and the discharge capacity retention ratio after 50 cycles at 1 C to the evaluation cells of Examples 1 to 4. These results are assumed to be due to the fact that the step of sintering a composite was performed at less than 600° C. in Comparative example 1, and thus the crystallinity of the carbon material could not be sufficiently improved and other components in the carbon-containing compound could not be removed.

Further, the results shown in Table 2 indicate that the evaluation cell of Comparative example 2 in which a peak originated from NbO$_2$ was observed and the XRD intensity ratio $I_A/I_B$ was 0.26 was inferior in the first cycle discharge capacity to the evaluation cells of Examples 1 to 4 and the evaluation cell of Comparative example 2 was significantly inferior in the ratio of the discharge capacity at 20 C to the discharge capacity at 0.2 C and the discharge capacity retention ratio after 50 cycles at 1 C to the evaluation cells of Examples 1 to 4. Further, the results indicate that the evaluation cell of Comparative example 3 in which a peak originated from $NbO_2$ was observed and the XRD intensity ratio $I_A/I_B$ was 1.01 was significantly inferior in the first cycle discharge capacity and the discharge capacity retention ratio after 50 cycles at 1 C to the evaluation cells of Examples 1 to 4. These results are assumed to be due to the fact that the step of sintering a composite was performed at 900° C. or more in Comparative examples 2 and 3, and thus $NbO_2$ was formed on the surface of the active material particles and a part of the composite disappeared with the formation.

Example 5

An active substance of Example 5 was produced in the same manner as Example 1, except that the sintering temperature in a reduction atmosphere of a composite was set to 830° C.

As the result of ICP analysis, it was found that the composition of active material particles prepared by the solid-phase method was $TiNb_2O_7$.

The resulting active substance was subjected to Raman spectrometry in the same manner as Example 1. As a result, it was found that the obtained active substance contained a carbon material having a D band at 1331 $cm^{-1}$ and a G band at 1579 $cm^{-1}$ in a Raman spectrum. Further, the Lorentzian function fitting method was performed, and a ratio $I_G/I_D$ between a peak intensity $I_G$ of the G band and a peak intensity $I_D$ of the D band was 1.06.

Further, the resulting active substance was subjected to wide-angle X-ray scattering measurement in the same manner as Example 1, and the same spectrum as Comparative Example 2 shown in FIG. 13 was obtained. In the resulting spectrum, a peak A was observed at the position of 2θ=26.53° and a peak B was observed at the position of 2θ=23.91°.

The obtained spectrum was confirmed using the JCPDS card. Then, it was confirmed that the obtained active substance had the same crystal structure as that of the monoclinic oxide $TiNb_2O_7$: JCPDS card 70-2009. Further, a peak not attributed to $TiNb_2O_7$ was well matched with a peak described in PDF-2 card 9-235. Thus, it was confirmed that the active substance had the same crystal structure as that of niobium dioxide $NbO_2$.

An intensity ratio $I_A/I_B$ between an intensity $I_A$ of the peak A and an intensity $I_B$ of the peak B was 0.06.

Example 6

An active substance of Example 6 was produced in the same manner as Example 1, except that the sintering temperature in a reduction atmosphere of a composite was set to 850° C.

As the result of ICP analysis, it was found that the composition of active material particles prepared by the solid-phase method was $TiNb_2O_7$.

The resulting active substance was subjected to Raman spectrometry in the same manner as Example 1. As a result, it was found that the obtained active substance contained a carbon material having a D band at 1348 $cm^{-1}$ and a G band at 1588 $cm^{-1}$ in a Raman spectrum. Further, the Lorentzian function fitting method was performed, and a ratio $I_G/I_D$ between a peak intensity $I_G$ of the G band and a peak intensity $I_D$ of the D band was 1.08.

Further, the resulting active substance was subjected to wide-angle X-ray scattering measurement in the same manner as Example 1, and the same spectrum as Comparative Example 2 shown in FIG. 13 was obtained. In the resulting spectrum, a peak A was observed at the position of 2θ=23.92° and a peak B was observed at the position of 2θ=26.51°.

The obtained spectrum was confirmed using the JCPDS card. Then, it was confirmed that the obtained active substance had the same crystal structure as that of the monoclinic oxide $TiNb_2O_7$: JCPDS card 70-2009. Further, peak not attributed to $TiNb_2O_7$ was well matched with a peak described in PDF-2 card 9-235. Thus, it was confirmed that the active substance had the same crystal structure as that of niobium dioxide $NbO_2$.

An intensity ratio $I_A/I_B$ between an intensity $I_A$ of the peak A and an intensity $I_B$ of the peak B was 0.11.

Example 7

An active substance of Example 7 was produced in the same manner as Example 1, except that the sintering temperature in a reduction atmosphere of a composite was set to 850° C. and the sintering was performed over 5 hours.

As the result of ICP analysis, it was found that the composition of active material particles prepared by the solid-phase method was $TiNb_2O_7$.

The resulting active substance was subjected to Raman spectrometry in the same manner as Example 1. As a result, it was found that the obtained active substance contained a carbon material having a D band at 1332 $cm^{-1}$ and a G band at 1582 $cm^{-1}$ in a Raman spectrum. Further, the Lorentzian function fitting method was performed, and a ratio $I_G/I_D$ between a peak intensity $I_G$ of the G band and a peak intensity $I_D$ of the D band was 1.12.

Further, the resulting active substance was subjected to wide-angle X-ray scattering measurement in the same manner as Example 1, and the same spectrum as Comparative Example 2 shown in FIG. 13 was obtained. In the resulting spectrum, a peak A was observed at the position of 2θ=23.98° and a peak B was observed at the position of 2θ=26.51°.

The obtained spectrum was confirmed using the JCPDS card. Then, it was confirmed that the obtained active substance had the same crystal structure as that of the monoclinic oxide $TiNb_2O_7$: JCPDS card 70-2009. Further, a peak not attributed to $TiNb_2O_7$ was well matched with a peak described in PDF-2 card 9-235. Thus, it was confirmed that the active substance had the same crystal structure as that of niobium dioxide $NbO_2$.

An intensity ratio $I_A/I_B$ between an intensity $I_A$ of the peak A and an intensity $I_B$ of the peak B was 0.20.

Example 8

An active substance of Example 8 was produced in the same manner as Example 1, except that the sintering temperature in a reduction atmosphere of a composite was set to 880° C.

As the result of ICP analysis, it was found that the composition of active material particles prepared by the solid-phase method was $TiNb_2O_7$.

The resulting active substance was subjected to Raman spectrometry in the same manner as Example 1. As a result, it was found that the obtained active substance contained a carbon material having a D band at 1342 $cm^{-1}$ and a G band at 1578 $cm^{-1}$ in a Raman spectrum. Further, the Lorentzian function fitting method was performed, and a ratio $I_G/I_D$ between a peak intensity $I_G$ of the G band and a peak intensity $I_D$ of the D band was 1.18.

Further, the resulting active substance was subjected to wide-angle X-ray scattering measurement in the same manner as Example 1, and the same spectrum as Comparative Example 2 shown in FIG. 13 was obtained. In the resulting spectrum, a peak A was observed at the position of 2θ=23.92° and a peak B was observed at the position of 2θ=26.53°.

The obtained spectrum was confirmed using the JCPDS card. Then, it was confirmed that the obtained active substance had the same crystal structure as that of the monoclinic oxide $TiNb_2O_7$: JCPDS card 70-2009. Further, a peak not attributed to $TiNb_2O_7$ was well matched with a peak described in PDF-2 card 9-235. Thus, it was confirmed that the active substance had the same crystal structure as that of niobium dioxide $NbO_2$.

An intensity ratio $I_A/I_B$ between an intensity $I_A$ of the peak A and an intensity $I_B$ of the peak B was 0.24.

Example 9

In Example 9, an active substance was produced by the following procedure, that is, the procedure including the hydrothermal method.

First, as starting material, solution of titanyl sulfate ($TiOSO_4$) in the diluted sulfuric acid and a solution of niobium chloride ($NbCl_5$) in ethanol were provided. And then, both of the solution were mixed so as to form mixed solution having a mole ratio Nb/Ti of 7:3. Aqueous ammonium was added to the mixed solution with stirring so as to adjust a pH of the solution to 8.

The resulting solution was transported to the autoclave container. The solution was subject to the heating at 170° C. for 5 hours. The resulting solution is subjected to the filtration and the washing with pure water to obtain precursor particles.

The structure of the resulting precursor particles was confirmed by X-ray scattering measurement. As a result, a halo peak was observed, and it was found that the precursor was in the amorphous state.

Subsequently, the resulting precursor particles were subjected to the sintering in the atmospheric air at 1100° C. for 1 hour, to obtain active material particles.

As the result of ICP analysis, it was found that the composition of the active material particles was $Ti_{0.965}Nb_{2.035}O_7$. This composition can be presented by the general formula: $Ti_{1-x}M_xNb_2O_7$, wherein x=0.035 and M=Nb. Furthermore, this composition can be also presented by the general formula: $Ti_{1-x}M1_xNb_{2-y}M2_yO_7$, wherein x=0.035, M1=Nb and y=0.

The active material particles obtained in the above manner were added to a solution containing 20% by weight of sucrose based on the weight of active material, followed by mixing with a ball mill. After mixing, the product was dried with a heater at 80° C. to evaporate excess water completely. In this way, there was obtained a composite including active material particles and a phase which contained a carbon-containing compound covering at least a part of the surface of the active material particles.

The resulting composite was subjected to reduction sintering at 750° C. for 1 hour under a nitrogen atmosphere. An active substance of Example 9 was obtained by the sintering.

The resulting active substance was subjected to Raman spectrometry in the same manner as Example 1. As a result, it was found that the obtained active substance contained a carbon material having a D band at 1342 $cm^{-1}$ and a G band at 1577 $cm^{-1}$ in a Raman spectrum. Further, the Lorentzian function fitting method was performed, and a ratio $I_G/I_D$ between a peak intensity $I_G$ of the G band and a peak intensity $I_D$ of the D band was 0.86.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 9 had a peak B attributed to monoclinic oxide $TiNb_2O_7$, but did not have a peak attributed to $NbO_2$.

Example 10

In Example 10, an active substance was produced by the following procedure, that is, the procedure including the coprecipitation method.

First, as starting material, solution of titanyl sulfate ($TiOSO_4$) in the diluted sulfuric acid and a solution of niobium chloride ($NbCl_5$) in ethanol were provided. And then, both of the solution were mixed so as to form mixed solution having a mole ratio Nb/Ti of 7:3. Aqueous ammonium was added to the mixed solution with stirring so as to adjust a pH of the solution to 8. Thus, coprecipitate was obtained. The obtained coprecipitate was put into the ball mill where the planetary wet ball milling was performed. And then, the filtration and the washing with pure water were performed to obtain precursor particles.

Subsequently, the resulting precursor particles were subjected to the sintering in the atmospheric air at 1100° C. for 1 hour, to obtain active material particles.

As the result of ICP analysis, it was found that the composition of the active material particles was $Ti_{0.965}Nb_{2.035}O_7$. This composition can be presented by the general formula: $Ti_{1-x}M_xNb_2O_7$, where x=0.035 and M=Nb. Furthermore, this composition can be also presented by the general formula: $Ti_{1-x}M1_xNb_{2-y}M2_yO_7$, wherein x=0.035, M1=Nb and y=0.

The active material particles obtained in the above manner were added to a solution containing 20% by weight of sucrose based on the weight of active material, followed by mixing with a ball mill. After mixing, the product was dried with a heater at 80° C. to evaporate excess water completely. In this way, there was obtained a composite including active material particles and a phase which contained a carbon-containing compound covering at least a part of the surface of the active material particles.

The resulting composite was subjected to reduction sintering at 750° C. for 1 hour under a nitrogen atmosphere. An active substance of Example 10 was obtained by the sintering.

The resulting active substance was subjected to Raman spectrometry in the same manner as Example 1. As a result, it was found that the obtained active substance contained a carbon material having a D band at 1351 $cm^{-1}$ and a G band at 1593 $cm^{-1}$ in a Raman spectrum. Further, the Lorentzian function fitting method was performed, and a ratio $I_G/I_D$ between a peak intensity $I_G$ of the G band and a peak intensity $I_D$ of the D band was 0.88.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 10 had a peak B attributed to monoclinic oxide $TiNb_2O_7$, but did not have a peak attributed to $NbO_2$.

Example 11

In Example 11, an active substance was produced by the following procedure, that is, the procedure including the sol-gel method.

First, as starting material, mixed solution of titanium tetraisopropoxide ($C_{12}H_{28}O_4Ti$) and ethanol, and a solution of niobium chloride ($NbCl_5$) in ethanol were provided. And then, both of the solution were mixed so as to form mixed solution having a mole ratio Nb/Ti of 2:1. Water was added to the mixed solution with stirring at room temperature so that the hydrolysis occurs. Thus, a gel-like solid was obtained. The solid was dried with a heater at 80° C. to evaporate solvent. Thus, precursor powders were obtained. The resulting precursor powder was mixed with ethanol, and the mixture was subjected to the planetary ball milling. And then, the filtration and the washing with pure water were performed to obtain precursor particles.

Subsequently, the resulting precursor particles were subjected to the sintering in the atmospheric air at 1100° C. for 12 hour, to obtain active material particles.

As the result of ICP analysis, it was found that the composition of the active material particles was $Ti_{0.965}Nb_{2.035}O_7$. This composition can be presented by the general formula: $Ti_{1-x}M_xNb_2O_7$, where x=0.035 and M=Nb. Furthermore, this composition can be also presented by the general formula: $Ti_{1-x}M1_xNb_{2-y}M2_yO_7$, wherein x=0.035, M1=Nb and y=0.

The active material particles obtained in the above manner were added to a solution containing 10% by weight of sucrose based on the weight of active material, followed by mixing with a ball mill. After mixing, the product was dried with a heater at 80° C. to evaporate excess water completely. In this way, there was obtained a composite including active material particles and a phase which contained a carbon-containing compound covering at least a part of the surface of the active material particles.

The resulting composite was subjected to reduction sintering at 750° C. for 1 hour under a nitrogen atmosphere. An active substance of Example 11 was obtained by the sintering.

The resulting active substance was subjected to Raman spectrometry in the same manner as Example 1. As a result, it was found that the obtained active substance contained a carbon material having a D band at 1350 $cm^{-1}$ and a G band at 1587 $cm^{-1}$ in a Raman spectrum. Further, the Lorentzian function fitting method was performed, and a ratio $I_G/I_D$ between a peak intensity $I_G$ of the G band and a peak intensity $I_D$ of the D band was 0.92.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 11 had a peak B attributed to monoclinic oxide $TiNb_2O_7$, but did not have a peak attributed to $NbO_2$.

Example 12

In Example 12, an active substance was produced by the following procedure.

First, titanium dioxide ($TiO_2$), niobium pentoxide ($Nb_2O_5$) and triiron tetraoxide ($Fe_3O_4$) were weighed so as to have a mole ratio of 93:101:1.67. These materials were placed in a mortar and ethanol was added thereto and mixed. Then, the mixture was placed into an alumina crucible, followed by heat treatment in atmospheric air at 1000° C. for 12 hours using an electric furnace. After natural cooling, the resulting mixture was ground and mixed again in the mortar. Then, the mixture was subjected to heat treatment at 1100° C. for 12 hours to prepare active material particles.

As the result of ICP analysis, it was found that the composition of the active material particles was $Ti_{0.93}Fe_{0.05}Nb_{2.02}O_7$. This composition can be presented by the general formula: $Ti_{1-x}M_xNb_2O_7$, wherein Ma=Fe, xa=0.05, Mb=Nb, xb=0.02, and x=xa+xb=0.07. Furthermore, this composition can be also presented by the general formula: $Ti_{1-x}M1_xNb_{2-y}M2_yO_7$, wherein M1a=Fe, xa=0.05, M1b=Nb, xb=0.02, x=xa+xb=0.07, and y=0.

The active material particles obtained in the above manner were added to a solution containing 10% by weight of sucrose based on the weight of active material, followed by mixing with a ball mill. After mixing, the product was dried with a heater at 80° C. to evaporate excess water completely. In this way, there was obtained a composite including active material particles and a phase which contained a carbon-containing compound covering at least a part of the surface of the active material particles.

The resulting composite was subjected to reduction sintering at 750° C. for 1 hour under a nitrogen atmosphere. An active substance of Example 12 was obtained by the sintering.

The resulting active substance was subjected to Raman spectrometry in the same manner as Example 1. As a result, it was found that the obtained active substance contained a carbon material having a D band at 1343 $cm^{-1}$ and a G band at 1581 $cm^{-1}$ in a Raman spectrum. Further, the Lorentzian function fitting method was performed, and a ratio $I_G/I_D$ between a peak intensity $I_G$ of the G band and a peak intensity $I_D$ of the D band was 0.96.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 12 had a peak B attributed to monoclinic oxide $TiNb_2O_7$, but did not have a peak attributed to $NbO_2$.

Example 13

In Example 13, an active substance was produced by the following procedure.

First, titanium dioxide ($TiO_2$), niobium pentoxide ($Nb_2O_5$) and tantalum pentoxide ($Ta_2O_5$) were weighed so as to have a mole ratio of 97:99:2.5. These materials were placed in a mortar and ethanol was added thereto and mixed. Then, the mixture was placed into an alumina crucible, followed by heat treatment in atmospheric air at 1000° C. for 12 hours using an electric furnace. After natural cooling, the resulting mixture was ground and mixed again in the mortar. Then, the mixture was subjected to heat treatment at 1100° C. for 12 hours to prepare active material particles.

As the result of ICP analysis, it was found that the composition of the active material particles was $Ti_{0.97}Ta_{0.05}Nb_{1.98}O_7$. This composition can be presented by the general formula: $Ti_{1-x}M1_xNb_{2-y}M2_yO_7$, wherein M1=Ta, x=0.03, M2=Ta, and y=0.02.

The active material particles obtained in the above manner were added to a solution containing 10% by weight of sucrose based on the weight of active material, followed by mixing with a ball mill. After mixing, the product was dried with a heater at 80° C. to evaporate excess water completely. In this way, there was obtained a composite including active material particles and a phase which contained a carbon-containing compound covering at least a part of the surface of the active material particles.

The resulting composite was subjected to reduction sintering at 750° C. for 1 hour under a nitrogen atmosphere. An active substance of Example 13 was obtained by the sintering.

The resulting active substance was subjected to Raman spectrometry in the same manner as Example 1. As a result, it was found that the obtained active substance contained a carbon material having a D band at 1339 cm$^{-1}$ and a G band at 1573 cm$^{-1}$ in a Raman spectrum. Further, the Lorentzian function fitting method was performed, and a ratio $I_G/I_D$ between a peak intensity $I_G$ of the G band and a peak intensity $I_D$ of the D band was 0.98.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 13 had a peak B attributed to monoclinic oxide $TiNb_2O_7$, but did not have a peak attributed to $NbO_2$.

Example 14

In Example 14, an active substance was produced by the following procedure.

First, titanium dioxide ($TiO_2$), niobium pentoxide ($Nb_2O_5$) and molybdenum trioxide ($MoO_3$) were weighed so as to have a mole ratio of 102:96.5:0.05. These materials were placed in a mortar and ethanol was added thereto and mixed. Then, the mixture was placed into an alumina crucible, followed by heat treatment in atmospheric air at 800° C. for 12 hours using an electric furnace. After natural cooling, the resulting mixture was ground and mixed again in the mortar. Then, the mixture was subjected to heat treatment at 1000° C. for 12 hours to prepare active material particles.

As the result of ICP analysis, it was found that the composition of the active material particles was $Ti_{1.02}Mo_{0.05}Nb_{1.93}O_7$. This composition can be presented by the general formula: $Ti_{1-x}M1_xNb_{2-y}M2_yO_7$, wherein x=0, M2a=Ti, ya=0.02, M2b=Mo, yb=0.05, and y=ya+yb.

The active material particles obtained in the above manner were added to a solution containing 10% by weight of sucrose based on the weight of active material, followed by mixing with a ball mill. After mixing, the product was dried with a heater at 80° C. to evaporate excess water completely. In this way, there was obtained a composite including active material particles and a phase which contained a carbon-containing compound covering at least a part of the surface of the active material particles.

The resulting composite was subjected to reduction sintering at 750° C. for 1 hour under a nitrogen atmosphere. An active substance of Example 14 was obtained by the sintering.

The resulting active substance was subjected to Raman spectrometry in the same manner as Example 1. As a result, it was found that the obtained active substance contained a carbon material having a D band at 1348 cm$^{-1}$ and a G band at 1584 cm$^{-1}$ in a Raman spectrum. Further, the Lorentzian function fitting method was performed, and a ratio $I_G/I_D$ between a peak intensity $I_G$ of the G band and a peak intensity $I_D$ of the D band was 0.92.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 14 had a peak B attributed to monoclinic oxide $TiNb_2O_7$, but did not have a peak attributed to $NbO_2$.

Example 15

In Example 15, an active substance was produced by the following procedure.

First, titanium dioxide ($TiO_2$), niobium pentoxide ($Nb_2O_5$) and vanadium pentoxide ($V_2O_5$) were weighed so as to have a mole ratio of 97:99:0.07. These materials were placed in a mortar and ethanol was added thereto and mixed. Then, the mixture was placed into an alumina crucible, followed by heat treatment in atmospheric air at 800° C. for 12 hours using an electric furnace. After natural cooling, the resulting mixture was ground and mixed again in the mortar. Then, the mixture was subjected to heat treatment at 1000° C. for 12 hours to prepare active material particles.

As the result of ICP analysis, it was found that the composition of the active material particles was $Ti_{0.97}V_{0.05}Nb_{1.98}O_7$. This composition can be presented by the general formula: $Ti_{1-x}M1_xNb_{2-y}M2_yO_7$, wherein M1=V, x=0.03, M2=V, and y=0.02.

The active material particles obtained in the above manner were added to a solution containing 10% by weight of sucrose based on the weight of active material, followed by mixing with a ball mill. After mixing, the product was dried with a heater at 80° C. to evaporate excess water completely. In this way, there was obtained a composite including active material particles and a phase which contained a carbon-containing compound covering at least a part of the surface of the active material particles.

The resulting composite was subjected to reduction sintering at 750° C. for 1 hour under a nitrogen atmosphere. An active substance of Example 15 was obtained by the sintering.

The resulting active substance was subjected to Raman spectrometry in the same manner as Example 1. As a result, it was found that the obtained active substance contained a carbon material having a D band at 1329 cm$^{-1}$ and a G band at 1581 cm$^{-1}$ in a Raman spectrum. Further, the Lorentzian function fitting method was performed, and a ratio $I_G/I_D$ between a peak intensity $I_G$ of the G band and a peak intensity $I_D$ of the D band was 0.93.

Further, the resulting active substance was subjected to wide-angle X-ray scattering measurement in the same manner as Example 1, and the same spectrum as Example 1 was obtained. In other words, the wide-angle X-ray spectrum of the active substance obtained in Example 15 had a peak B attributed to monoclinic oxide $TiNb_2O_7$, but did not have a peak attributed to $NbO_2$.

Regarding the active substances of Examples 5 to 15, the composite sintering temperature, the Raman band intensity ratio $I_G/I_D$, and the XRD intensity ratio are shown in Table 3 below.

TABLE 3

|  | Sintering Temperature of Composite (° C.) | Composition of Active Material | Raman band intensity ratio $I_G/I_D$ | XRD intensity ratio $I_A/I_B$ |
|---|---|---|---|---|
| Example 5 | 830 | $TiNb_2O_7$ | 1.06 | 0.06 |
| Example 6 | 850 | $TiNb_2O_7$ | 1.08 | 0.11 |
| Example 7 | 850 | $TiNb_2O_7$ | 1.12 | 0.2 |
| Example 8 | 880 | $TiNb_2O_7$ | 1.18 | 0.24 |

TABLE 3-continued

| | Sintering Temperature of Composite (° C.) | Composition of Active Material | Raman band intensity ratio $I_G/I_D$ | XRD intensity ratio $I_A/I_B$ |
|---|---|---|---|---|
| Example 9 | 750 | $Ti_{0.965}Nb_{2.035}O_7$ | 0.86 | (No Peak A) |
| Example 10 | 750 | $Ti_{0.965}Nb_{2.035}O_7$ | 0.88 | (No Peak A) |
| Example 11 | 750 | $TiNb_2O_7$ | 0.92 | (No Peak A) |
| Example 12 | 750 | $Ti_{0.93}Fe_{0.05}Nb_{2.02}O_7$ | 0.96 | (No Peak A) |
| Example 13 | 750 | $Ti_{0.97}Ta_{0.05}Nb_{1.98}O_7$ | 0.98 | (No Peak A) |
| Example 14 | 750 | $Ti_{1.02}Mo_{0.05}Nb_{1.93}O_7$ | 0.92 | (No Peak A) |
| Example 15 | 750 | $Ti_{0.97}V_{0.05}Nb_{1.98}O_7$ | 0.93 | (No Peak A) |

<Production of Evaluation Cell and Evaluation of Charge and Discharge Characteristics>

The evaluation cells of Examples 5 to 15 were produced by the same procedure as that of Example 1 to 4 and Comparative Example 1 to 5 except that each of the active substances of Examples 5 to 15 were used.

Regarding each of the evaluation cells of Examples 5 to 15, the charge and discharge test was performed by the same procedure as those of Example 1 to 4 and Comparative Example 1 to 5. The results are described in Table 4 below.

TABLE 4

| | First Cycle Discharge Capacity (mAh/g) | Ratio (%) of Discharge Capacity at 20 C to Discharge Capacity at 0.2 C | Discharge Capacity Retention Ratio (%) after 50 Cycles at 1 C | Average Charge and Discharge Efficiency (%) |
|---|---|---|---|---|
| Example 5 | 273.1 | 87.3 | 91.6 | 99.2 |
| Example 6 | 271.1 | 88.2 | 92.7 | 99.1 |
| Example 7 | 265.4 | 88.9 | 94.8 | 98.6 |
| Example 8 | 255.1 | 90.6 | 96.6 | 98.8 |
| Example 9 | 292.1 | 94.6 | 94.3 | 97.4 |
| Example 10 | 293.6 | 93.8 | 95.1 | 97.5 |
| Example 11 | 278.4 | 84.2 | 92.4 | 98.7 |
| Example 12 | 283.4 | 87.1 | 93.2 | 99.1 |
| Example 13 | 280.3 | 83.1 | 91.3 | 99.2 |
| Example 14 | 282.7 | 87.4 | 92.1 | 99.4 |
| Example 15 | 281.7 | 86.9 | 92.5 | 99.3 |

The comparison between the results shown in Table 2 and the results shown in Table 4 shows that each of the cell of Examples 5 to 8 is inferior in the first cycle discharge capacity to that of Example 4 due to the inclusion of $NbO_2$. However, it is found that each of the evaluation cells of Examples 5 to 8 exhibited the improved ratio (%) of the discharge capacity at 20 C to the discharge capacity at 0.2 C and the improved discharge capacity retention ratio (%) after 50 cycles at 1 C, compared to those of Example 4. These results are assumed to be due to the fact that the higher sintering temperature led to the change of crystallinity of the carbon formed on the surface of the active material and the fact that $NbO_2$ having high electron conductivity was included in a small amount, and the electron conductivity of the active substance had improved electron conductivity.

In Example 9 to 11, each of the active substance was produced by the procedure including the hydrothermal method, the coprecipitation method, and the sol-gel method, respectively. Compared with the evaluation cell of Example 3 including the active substance produced by the procedure including the solid-phase method, the first cycle discharge capacity, the ratio of the discharge capacity at 20 C to the discharge capacity at 0.2 C, and the discharge capacity retention ratio after 50 cycles at 1 C of the evaluation cell of Example 11 were the same as those of Example 3. The evaluation cells of the Example 9 and 10 were superior in these characteristics to those of Example 3. This fact shows that the procedure including other methods than the solid-phase method can be expected to produce the active substance having the same excellent characteristics as those of the active substance produced by the procedure including the solid-phase method. In particular, the reason why the improvement by the coprecipitation method and the sol-gel method was observed is that in those method, the sintering temperature was low, and the resulting particles were smaller than those prepared by the solid-phase method, resulting in the improvement in the diffusibility of Li in bulk and in the suppression of the volumeric expansion and the shrinkage.

It is found that the evaluation cells of Example 12 to 15 exhibited the improvement in the first cycle discharge capacity, the ratio of the discharge capacity at 20 C to the discharge capacity at 0.2 C, and the discharge capacity retention ratio after 50 cycles at 1 C, compared to those of Example 3. This is assumed to be due to the fact that the electronic conductivity of the active material was improved by substituting a part of the element Ti and/or the element Nb for the elements M1 and M2 having different valences. Further, it is found that, in Example 14 in which Mo element was used as a substituted element and in Example 15 in which V element is used as a substituted element, each of a raw material including Mo and a raw material including V functioned as sintering aids, and thus the same or higher characteristics were obtained even under the sintering conditions at 1000° C. for 12 hour.

The active substance according to at least one of the embodiments and examples includes niobium titanium composite oxide particles and a phase including a carbon material in which a ratio $I_G/I_D$ between a peak intensity $I_G$ of the G band and a peak intensity $I_D$ of the D band in a Raman spectrum chart is from 0.8 to 1.2. Consequently, it is possible to realize a nonaqueous electrolyte battery excellent in rate characteristics and cycle characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active substance comprising:
   particles of niobium titanium composite oxide represented by $Ti_{1-x}M1_xNb_{2-y}M2_yO_7$ (wherein $0 \leq x < 1$, $0 \leq y < 1$, and each of an element M1 and an element M2 is at least one selected from the group consisting of Nb, V, Ta, Fe, Ti, Bi, Sb, As, P, Cr, Mo, W, B, Na, Mg, Al, and Si, and the element M1 and the element M2 are identical or different from each other); and
   a phase comprising a carbon material, the phase formed on at least a part of the surface of the particles;
   wherein the carbon material shows, in a Raman chart obtained by Raman spectrometry using a 532-nm measuring light source, a G band observed at from 1530 to 1630 $cm^{-1}$ and a D band observed at from 1280 to 1380 cm$^{-1}$, and a ratio $I_G/I_D$ between a peak intensity $I_G$ of the G band and a peak intensity $I_D$ of the D band is from 0.8 to 1.2, and wherein the active substance has a peak A present at the position of 2θ=26.37° to 26.77° and a peak B present at the position of 2θ=23.76 to 24.16° in a spectrum obtained by wide-angle X-ray scattering measurement using CuKα rays, the peak A is attributed to a crystal structure of a tetragonal oxide comprising a tetravalent niobium, the peak B is attributed to a crystal structure of a monocyclic oxide $TiNb_2O_7$, and an intensity ratio $I_A/I_B$ between the peak A and the peak B is more than 0 and 0.25 or less.

2. A nonaqueous electrolyte battery comprising:
a negative electrode comprising the active substance according to claim 1;
a positive electrode; and
a nonaqueous electrolyte.

3. The nonaqueous electrolyte battery according to claim 2, wherein the nonaqueous electrolyte comprises at least one selected from the group consisting of a liquid nonaqueous electrolyte, a gel-like nonaqueous electrolyte, a polymer solid nonaqueous electrolyte and an inorganic solid electrolyte.

4. A battery pack comprising at least one nonaqueous electrolyte battery comprising a negative electrode comprising the active substance according to claim 1; a positive electrode; and a nonaqueous electrolyte.

5. The battery pack according to claim 4, further comprising:
an external energizing terminal; and
a protective circuit.

6. The battery pack according to claim 4, comprising plural nonaqueous electrolyte batteries, each of the nonaqueous electrolyte batteries being the nonaqueous electrolyte battery according to claim 2, the nonaqueous electrolyte batteries being electrically connected in series, in parallel or with a combination of series connection and parallel connection.

7. The active substance according to claim 1, wherein the niobium titanium composite oxide has a monoclinic crystal structure.

8. The active substance according to claim 1, wherein the phase comprising the carbon material covers the whole surface of the particles of the niobium titanium composite oxide.

9. The active substance according to claim 1, wherein the phase comprising the carbon is supported on a part of the surface of the particles of the niobium titanium composite oxide.

10. The active substance according to claim 1, wherein an average particle size of the particles of the niobium titanium composite oxide is from 0.1 μm to 10 μm.

11. The active substance according to claim 1, wherein a specific surface area of the particles of the niobium titanium composite oxide is 5 m$^2$/g or more and less than 200 m$^2$/g.

12. An active substance comprising:
particles of niobium titanium composite oxide represented by $Ti_{1-x}M_xNb_2O_7$ (wherein 0≤x<1 and an element M is at least one selected from the group consisting of Nb, V, Ta, Bi, Sb, As, P, Cr, Mo, W, B, Na, Mg, Al, and Si); and
a phase comprising a carbon material, the phase formed on at least a part of the surface of the particles;
wherein the carbon material shows, in a Raman chart obtained by Raman spectrometry using a 532-nm measuring light source, a G band observed at from 1530 to 1630 cm$^{-1}$ and a D band observed at from 1280 to 1380 cm$^{-1}$ and a ratio $I_G/I_D$ between a peak intensity $I_G$ of the G band and a peak intensity $I_D$ of the D band is from 0.8 to 1.2, and
wherein the active substance has a peak A present at the position of 2θ=26.37° to 26.770 and a peak B present at the position of 2θ=23.76 to 24.16° in a spectrum obtained by wide-angle X-ray scattering measurement using CuKα rays, the peak A is attributed to a crystal structure of a tetragonal oxide comprising a tetravalent niobium, the peak B is attributed to a crystal structure of a monocyclic oxide $TiNb_2O_7$, and an intensity ratio $I_A/I_B$ between the peak A and the peak B is more than 0 and 0.25 or less.

* * * * *